United States Patent
Rangavajhala et al.

(10) Patent No.: US 11,012,317 B2
(45) Date of Patent: May 18, 2021

(54) VISUALIZATION FOR MONITORING INFRASTRUCTURE ENTITIES

(71) Applicant: salesforce.com, inc., San Francisco, CA (US)

(72) Inventors: Venkata Rama Pavan Kumar Rangavajhala, Sunnyvale, CA (US); Arjun Srinivasan, Atlanta, GA (US)

(73) Assignee: salesforce.com, inc., San Francisco, CA (US)

( * ) Notice: Subject to any disclaimer, the term of this patent is extended or adjusted under 35 U.S.C. 154(b) by 149 days.

(21) Appl. No.: 15/681,089

(22) Filed: Aug. 18, 2017

(65) Prior Publication Data

US 2019/0058639 A1 Feb. 21, 2019

(51) Int. Cl.
*H04L 12/24* (2006.01)
*G06F 11/32* (2006.01)
(Continued)

(52) U.S. Cl.
CPC .......... *H04L 41/22* (2013.01); *G05B 23/0272* (2013.01); *G06F 11/321* (2013.01);
(Continued)

(58) Field of Classification Search
CPC ...... G06F 11/14; G06F 11/00; G06F 11/0751; G06F 2201/805; G06F 2201/84; G06F 2221/034; G06F 11/321; G06F 11/079; G06F 9/453; G06F 16/358; G06F 11/3051; G06F 11/3058; G06F 11/328; G06F 11/3409; G06F 21/552; G06F 3/04842; G06F 3/0236; G06F 11/3055; G06F 2009/45591; H04L 41/22; H04L 41/0604; H04L 43/04; H04L 43/045; H04L 41/147;
(Continued)

(56) References Cited

U.S. PATENT DOCUMENTS 5,577,188 A 11/1996 Zhu
5,608,872 A 3/1997 Schwartz
(Continued)

OTHER PUBLICATIONS

"D3 Data-Driven Documents", D3.js—Data-Driven Documents, https://d3js.org/, visited May 19, 2017, 6 pages.
(Continued)

*Primary Examiner* — Kamal B Divecha
*Assistant Examiner* — Alex H. Tran
(74) *Attorney, Agent, or Firm* — Lowenstein Sandler LLP

(57) ABSTRACT

An infrastructure monitor receives an indication of a fault on a first host computer of a plurality of host computers, wherein each of the plurality of host computers is associated with a different subset of a plurality of queues, and wherein each of the plurality of queues are serviced by a different subset of the plurality of host computers. The monitor identifies a first subset of the plurality of queues associated with the first host computer and determines a workload present on the first subset of the plurality of queues. The monitor further generates a single visualization to provide the indication of the fault on the first host computer, the first subset of the plurality of queues impacted by the fault, and the workload present on the first subset of the plurality of queues and causes presentation of the single visualization.

9 Claims, 16 Drawing Sheets

(51) Int. Cl.
*G05B 23/02* (2006.01)
*H04L 12/26* (2006.01)

(52) U.S. Cl.
CPC ............ *H04L 43/045* (2013.01); *H04L 43/08* (2013.01); *H04L 43/16* (2013.01); *H04L 43/0823* (2013.01)

(58) Field of Classification Search
CPC ..... H04L 43/09; H04L 43/08; H04L 43/0876; H04L 43/0823; G05B 23/0272
See application file for complete search history.

(56) References Cited

U.S. PATENT DOCUMENTS

| | | | |
|---|---|---|---|
| 5,649,104 | A | 7/1997 | Carleton |
| 5,715,450 | A | 2/1998 | Ambrose et al. |
| 5,761,419 | A | 6/1998 | Schwartz |
| 5,819,038 | A | 10/1998 | Carleton |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier |
| 6,654,032 | B1 | 11/2003 | Zhu |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu |
| 6,768,904 | B2 | 7/2004 | Kim |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,340,411 | B2 | 3/2008 | Cook |
| 7,523,187 | B1 * | 4/2009 | Lavallee ................ H04L 41/12 709/220 |
| 7,620,655 | B2 | 11/2009 | Larsson |
| 8,151,269 | B1 * | 4/2012 | Brown .................. G06F 16/217 718/103 |
| 8,818,988 | B1 * | 8/2014 | Brown .................. G06F 16/217 707/713 |
| 9,164,786 | B2 * | 10/2015 | Bingham ............ G06F 9/45533 |
| 9,495,187 | B2 * | 11/2016 | Bingham ............ G06T 11/206 |
| 9,524,296 | B2 * | 12/2016 | Richards ........... G06F 16/24569 |
| 9,946,577 | B1 * | 4/2018 | Stafford ............ H04L 29/08189 |
| 10,162,678 | B1 * | 12/2018 | Stafford ............... G06F 9/5077 |
| 10,180,768 | B1 * | 1/2019 | Capano ............ G06F 3/04817 |
| 10,547,521 | B1 * | 1/2020 | Roy ..................... H04L 43/0876 |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0129352 | A1 | 9/2002 | Brodersen et al. |
| 2002/0140731 | A1 | 10/2002 | Subramaniam et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0130821 | A1 * | 7/2003 | Anslow .................... H04L 41/12 702/186 |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2003/0229693 | A1 * | 12/2003 | Mahlik ............... H04L 43/0882 709/224 |
| 2004/0001092 | A1 | 1/2004 | Rothwein et al. |
| 2004/0010489 | A1 | 1/2004 | Rio et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes Leon et al. |
| 2004/0199543 | A1 | 10/2004 | Braud et al. |
| 2004/0249854 | A1 | 12/2004 | Barnes-Leon et al. |
| 2004/0250260 | A1 * | 12/2004 | Pioso .................. G06F 11/0709 719/316 |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2006/0026179 | A1 * | 2/2006 | Brown .................. G06F 16/217 |
| 2006/0072463 | A1 * | 4/2006 | Manthoulis ......... H04L 41/0896 370/241 |
| 2009/0287720 | A1 * | 11/2009 | Herter ................... G06F 11/328 |
| 2013/0159910 | A1 * | 6/2013 | Bostic ................ G06F 11/3409 715/772 |
| 2013/0227573 | A1 * | 8/2013 | Morsi .................. G06F 9/5083 718/100 |
| 2014/0068343 | A1 * | 3/2014 | Nakajima ........... G06F 11/0751 714/39 |
| 2014/0269403 | A1 * | 9/2014 | Anghel ................ H04L 43/0817 370/253 |
| 2014/0325363 | A1 * | 10/2014 | Fletcher ................ H01L 41/22 715/736 |

(56) References Cited

U.S. PATENT DOCUMENTS

| | | | | |
|---|---|---|---|---|
| 2015/0229546 A1* | 8/2015 | Somaiya | ............... | G06F 11/328 |
| | | | | 715/736 |
| 2015/0301861 A1* | 10/2015 | LaChiusa | .................. | G06F 9/54 |
| | | | | 718/102 |
| 2016/0011925 A1* | 1/2016 | Kulkarni | ............. | G06F 11/3006 |
| | | | | 714/57 |
| 2016/0013990 A1* | 1/2016 | Kulkarni | ............... | H04L 41/065 |
| | | | | 709/224 |
| 2016/0117058 A1* | 4/2016 | Maruyama | .............. | G06F 16/00 |
| | | | | 715/854 |
| 2017/0171041 A1* | 6/2017 | Knowler | ................. | H04L 43/08 |
| 2017/0264486 A1* | 9/2017 | Angell | ................ | H04L 41/0806 |
| 2017/0353243 A1* | 12/2017 | Brueckheimer | ... | H04B 10/0793 |
| 2018/0232295 A1* | 8/2018 | Sukoco | ................. | G06F 9/4843 |
| 2018/0285008 A1* | 10/2018 | Challagolla | ............ | G06F 3/0605 |
| 2018/0341394 A1* | 11/2018 | Sangli | ................... | G06F 3/0481 |

OTHER PUBLICATIONS

"The Conversation", Concept map—The Conversation, http://www.findtheconversation.com/concept-map/, visited May 19, 2017, 3 pages.

Spicuzza, Dustin, "Concept Map playlist visualization generated by Exaile 3.4 beta 3", Concept Map playlist visualization generated by Exaile 3.4 beta3-bl.ocks.org, http://bl.ocks.org/virtuald/ea7438cb8c6913196d8e, visited May 19, 2017, 5 pages.

* cited by examiner

VISUALIZATION FOR MONITORING INFRASTRUCTURE ENTITIES

TECHNICAL FIELD

This disclosure relates to the field of infrastructure monitoring, and in particular to a visualization for monitoring infrastructure entities.

BACKGROUND

"Cloud computing" services provide shared resources, software, and information to computers and other devices upon request or on demand. Cloud computing typically involves the over-the-Internet provision of dynamically-scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems. Some of the applications or on-demand services provided to end-users can include the ability for a user to create, view, modify, store and share documents and other files.

BRIEF DESCRIPTION OF THE DRAWINGS

The present invention will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
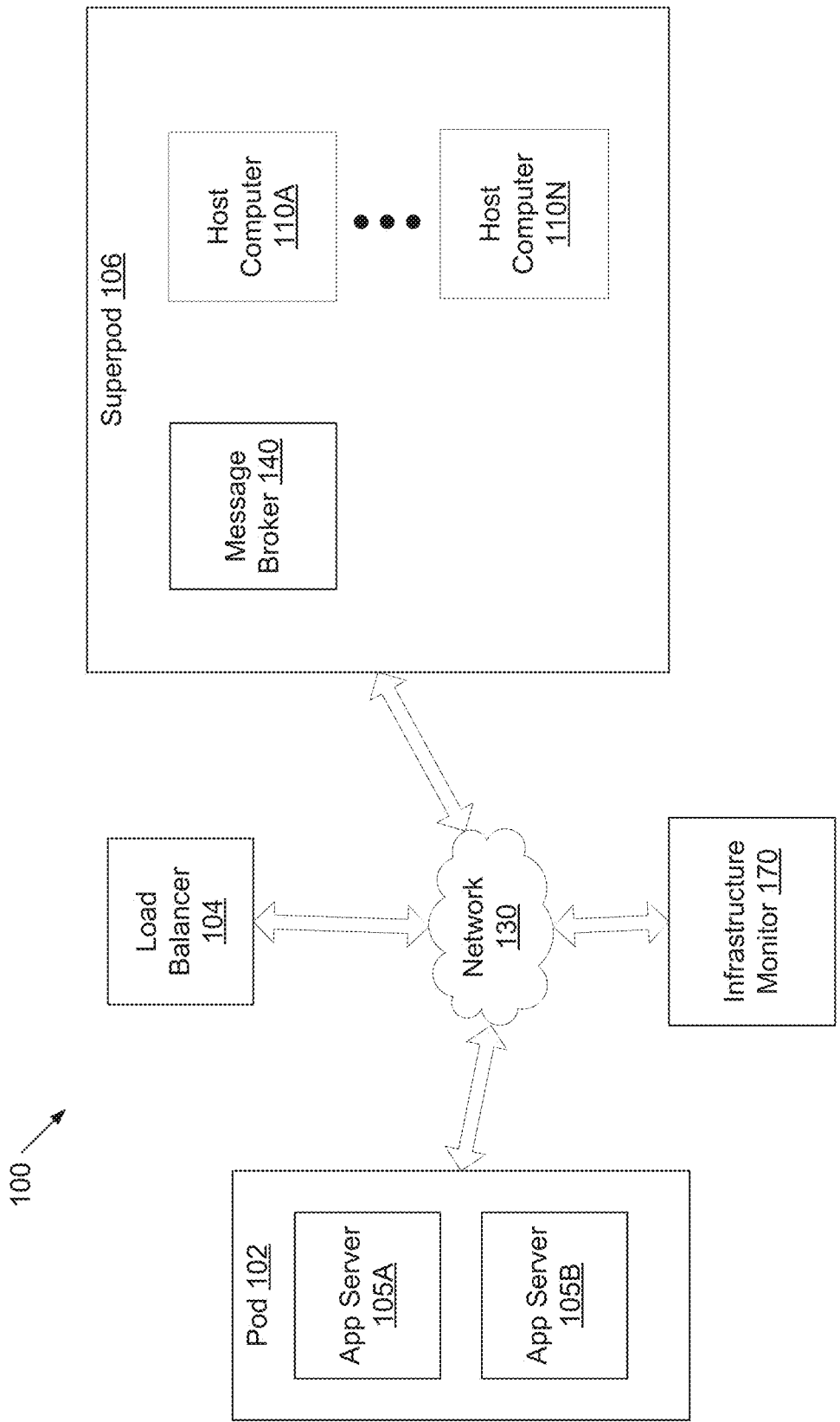
FIG. 1 is a block diagram of an exemplary network architecture, in which embodiments of the present disclosure may operate.

Embodiments are described for generating visualizations for monitoring infrastructure entities. The architecture in certain data centers can present challenges in monitoring the overall health of the system. One example architecture includes backend clusters that run services made up of queues and workers (i.e., host computers). The queues may include logical entities where jobs from clients or applications are placed to await processing. The workers may include host computers or other devices that listen to the queues, retrieve jobs and execute instructions corresponding to those jobs in order to take appropriate actions or complete tasks. In one embodiment, the queues and workers have a many-to-many relationship. For example, each queue may be listened to or monitored by at least three different workers and each worker may listen to or monitor multiple different queues (e.g., 10-15 different queues). Thus, the relationship between the queues and the workers in the system is complex. Consequently, when one of the host computers suffers a fault, error, performance degradation, etc., it can be difficult to determine and effectively communicate to a user or system administrator the effect on the overall system, including which queues will be impacted by the poor health of the host computer. The present disclosure describes a single visualization designed for presenting the health of multiple infrastructure entities (e.g., queues and workers) having a many-to-many relationship.

In one embodiment, an infrastructure monitor renders a visualization to present infrastructure monitoring data, such as alerts, usage, metrics, etc., for components involved in a many-to-many relationship. In one embodiment, an alert-only view, illustrates the health of workers (i.e., host computers), as well as the health of each queue, based on the number of healthy workers across one or more unique racks that are mapped to the queue and the usage of the queue. In one embodiment, representations of the queues are rendered in the center of the visualization, in a grid layout, and workers are rendered in a substantially circular radial layout around the queue grid. In one embodiment, the size of a circle representing a queue, along with a corresponding heat map color represents the workload (i.e., usage) of the queue. The workers may be grouped by their rack, with the workers in each rack being displayed in a unique color. In one embodiment, overall worker health is indicated by a checkmark or other icon alongside each worker name. Each queue to worker mapping is represented as a thin curved line between a worker and the corresponding queue or queues. In one embodiment, the impact of workers in bad health on the mapped queues is represented using broken lines highlighted in a different color. Queues with health in a warning or critical state can be highlighted with an appropriate color (e.g., orange or red respectively).

In addition to alerts based on the worker health, the visualization is scalable in other embodiments, to present multiple types of critical system and application metrics at the worker level. These metric views can be generally categorized into two types, namely summary level metrics and individual level metrics. The summary metric view presents a visualization of multiple metrics for each worker next to its name or other identifier, in effect producing multiple concentric heat maps at the cluster level. A user or administrator can highlight the heat map for a specific metric for all workers by toggling the metric name in the legend. The individual metric view presents a visualization of one metric at a time in the form of more elaborate charts such as gauges, bullet charts, average-min-max charts, circular progress bars etc., with the metric values being presented accordingly next to the worker name.

In one embodiment, the visualization is interactive. A user can hover over, highlight, click-on, tap or otherwise select a particular queue, to cause visualization of links to the workers to which the queue is mapped in addition to more details about the queue in a pop-up window. Similarly, a user can select a particular worker to cause visualization of the links to the queues which are serviced by the worker and/or additional details about the worker. In one embodiment, the visualization can be dynamically re-rendered or updated in response to real time events such as new alerts, new query usage data, changes in host maintenance status, etc.

The visualizations described herein allow for the depiction of highly complex data with great ease and for the diverse and scalable unification of multiple types of visualizations for aggregated and individual metric views in a single chart. These visualizations allow the user focus on only the critical information to be acted upon.

I. Visualization for Monitoring Infrastructure Entities

FIG. 1 is a block diagram of an exemplary network architecture 100, in which embodiments of the present disclosure may operate. In one embodiment, the network architecture 100 includes a superpod 106 comprising one or more host computers 110A-110N, which may be employed to provide cloud computing services to one or more application servers 105A-105B in pod 102. The application servers 105A-105B in pod 102 may communicate with host computers 110A-110N in superpod 106 via one or more networks 130. A load balancer 104 can distribute server load over different pods, including pod 102 and superpod 106. Pods can each include one or more servers or other computing resources for performing data processing and other operations used to provide on-demand services. Application servers 105A-105B are representative of any number of devices which may communicate with host computers 110A-110N for storing and accessing data and executing commands in network architecture 100. In some implementations, the applications servers 105A-105B include a hardware or software framework dedicated to the execution of procedures (for example, programs, routines, scripts) for supporting the construction of applications provided by an on-demand database service environment via the pod 102. In some implementations, the hardware or software framework of application servers 105A-105B is configured to execute operations of the services described herein, including performance of the blocks of various methods or processes described herein. In some alternative implementations, multiple application servers 105A-105B can be included and cooperate to perform such methods, or one or more other servers described herein can be configured to perform the disclosed methods. Application servers 105A-105B are representative of any number of stationary or mobile computers such as desktop personal computers (PCs), servers, server farms, workstations, laptops, handheld computers, servers, personal digital assistants (PDAs), smart phones, and so forth. It is noted that some systems may include only a single application server, connected directly or remotely, to host computers 110A-110N.

In alternative embodiments, the number and type of application servers and host computers is not limited to those shown in FIG. 1. At various times one or more applications servers may operate offline. In addition, during operation, individual application server connection types may change as users connect, disconnect, and reconnect to network architecture 100. Further, the systems and methods described herein may be applied to directly attached computing systems or network attached computing systems and may include a host operating system configured to perform one or more aspects of the described methods. Numerous such alternatives are possible and are contemplated.

In one embodiment, network 130 may utilize a variety of techniques including wireless connections, direct local area network (LAN) connections, wide area network (WAN) connections such as the Internet, a router, storage area network, Ethernet, and others. Network 130 may comprise one or more LANs that may also be wireless. Network 130 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 130. The network 130 may interface with a set of communications protocols used for the Internet such as the Transmission Control Protocol (TCP) and the Internet Protocol (IP), or TCP/IP.

In one embodiment, each host computer 110A-110N may be associated with one or more data storage devices. Examples of data storage devices include solid-state drives (SSDs), flash memory, magnetic or optical disks, tape drives, RAID arrays, EEPROM devices, storage area networks, network-attached storage, and/or any other devices capable of storing data. Host computers 110A-110N may each include one or more processing devices, each comprising one or more processor cores. Each processor core includes circuitry for executing instructions according to a predefined general-purpose instruction set. The processor cores may access cache memory subsystems for data and computer program instructions. The cache subsystems may be coupled to a memory hierarchy comprising random access memory (RAM) and a storage device. Each of processing devices are configured to execute instructions of one or more customer processes or applications on behalf of application servers 105A-105B.

In one embodiment, network architecture 100 further includes infrastructure monitor 170. Infrastructure monitor 170 may run on a standalone machine connected to host computers 110A-110N via network 130 or may be distributed across two or more physical machines, including host computers 110A-110N and/or other machines. In one embodiment, infrastructure monitor 170 receives an indication of a fault on a first host computer 110A of a plurality of host computers, wherein each of the plurality of host computers is associated with a different subset of a plurality of queues maintained by message broker 140, and wherein each of the plurality of queues are serviced by a different subset of the plurality of host computers 110A-110N. Infrastructure monitor 170 can identify a first subset of the plurality of queues associated with the first host computer and determine a workload present on the first subset of the plurality of queues. In one embodiment, infrastructure monitor 170 further generates a single visualization to provide the indication of the fault on the first host computer 110A, the first subset of the plurality of queues impacted by the fault, and the workload present on the first subset of the plurality of queues and causes presentation of the single visualization.

In one embodiment, superpod 106 includes a number of components monitored by infrastructure monitor 170, each of which may be classified as either a Service Check or a Metric Collector, running on one or more of host computers 110A-110N or message broker 140. The Service Check components report a status to infrastructure monitor 170. The Metric Collector components to report time-series metrics via a metric pipeline to a central time-series monitoring system in infrastructure monitor 170. Similarly, application logs from each of the services on the host computers 110A-110N are forwarded to a central log monitoring system in infrastructure monitor 170. Infrastructure monitor 170 can aggregate the monitoring data from Service Check components and Metric Collector components to produce the visualizations illustrated herein. Additional details of infrastructure monitor 170 and message broker 140 are provided below.

Figure 2:
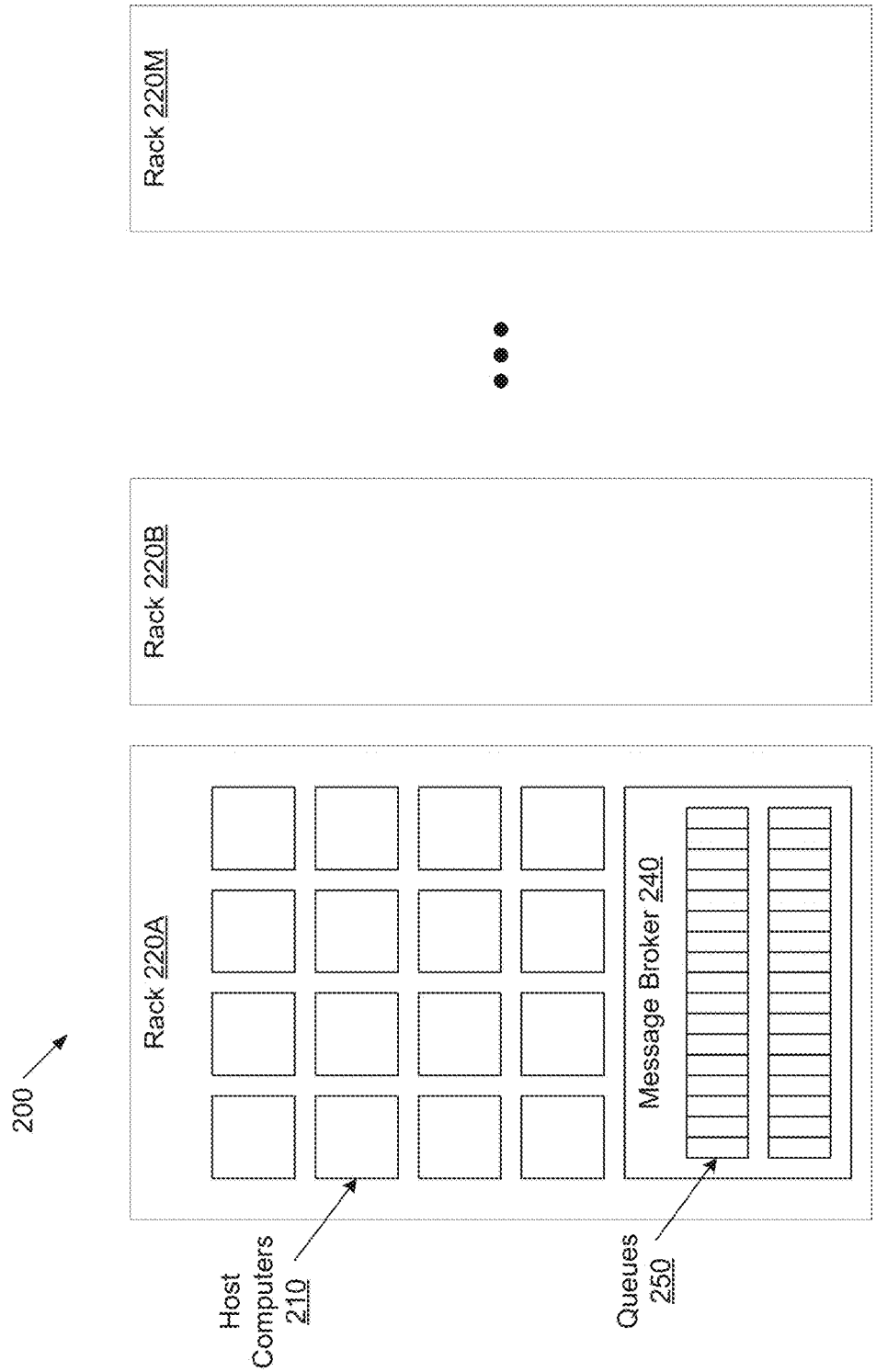
FIG. 2 is a block diagram illustrating a data center arrangement, in which embodiments of the present disclosure may be implemented.

FIG. 2 is a block diagram illustrating a data center arrangement 200, in which embodiments of the present disclosure may be implemented. In one embodiment, the data center arrangement 200 includes a number of racks 220A-220M, each housing a number of host computers 210. In one embodiment, the data center arrangement 200 may include approximately 100 host computers distributed across six racks (i.e., 16 or 17 host computers per rack). In addition to host computers 210, each of racks 220A-220M may include a message broker 240, on which a number of queues reside. In one embodiment, each message broker 240 may include approximately 512 queues. In one embodiment, jobs are queued via load balancer 104 that, at a given point of time, picks one of the message brokers 240 (e.g., in a round-robin fashion), and redirects a current job to the chosen message broker. This load balancing mechanism may not affect the way that the network monitoring and visualization works. The visualizations described herein, assume that there are 512 logical queue entities, where each host computer 210 is assigned the same queue numbers across each of the message brokers 240.

In one embodiment, there is a many-to-many relationship between queues 250 and host computers 210. For example, each queue 250 may be listened to or monitored by at least three different host computers 210 and each host computer 210 may listen to or monitor approximately 10-15 different queues 250. In one embodiment, each of the host computers 210 that listen to a particular one of queues 250 are physically located on a different one of racks 220A-220M. In this manner, if the power supply to an entire rack is disconnected, or the rack suffers some other failure or service interruption, there will still be host computers on other racks available to service the queue. Similarly, in one embodiment, the 10-15 queues 250 that each host computer 210 listens to may be distributed across message brokers 240 on different racks.

Figure 3:
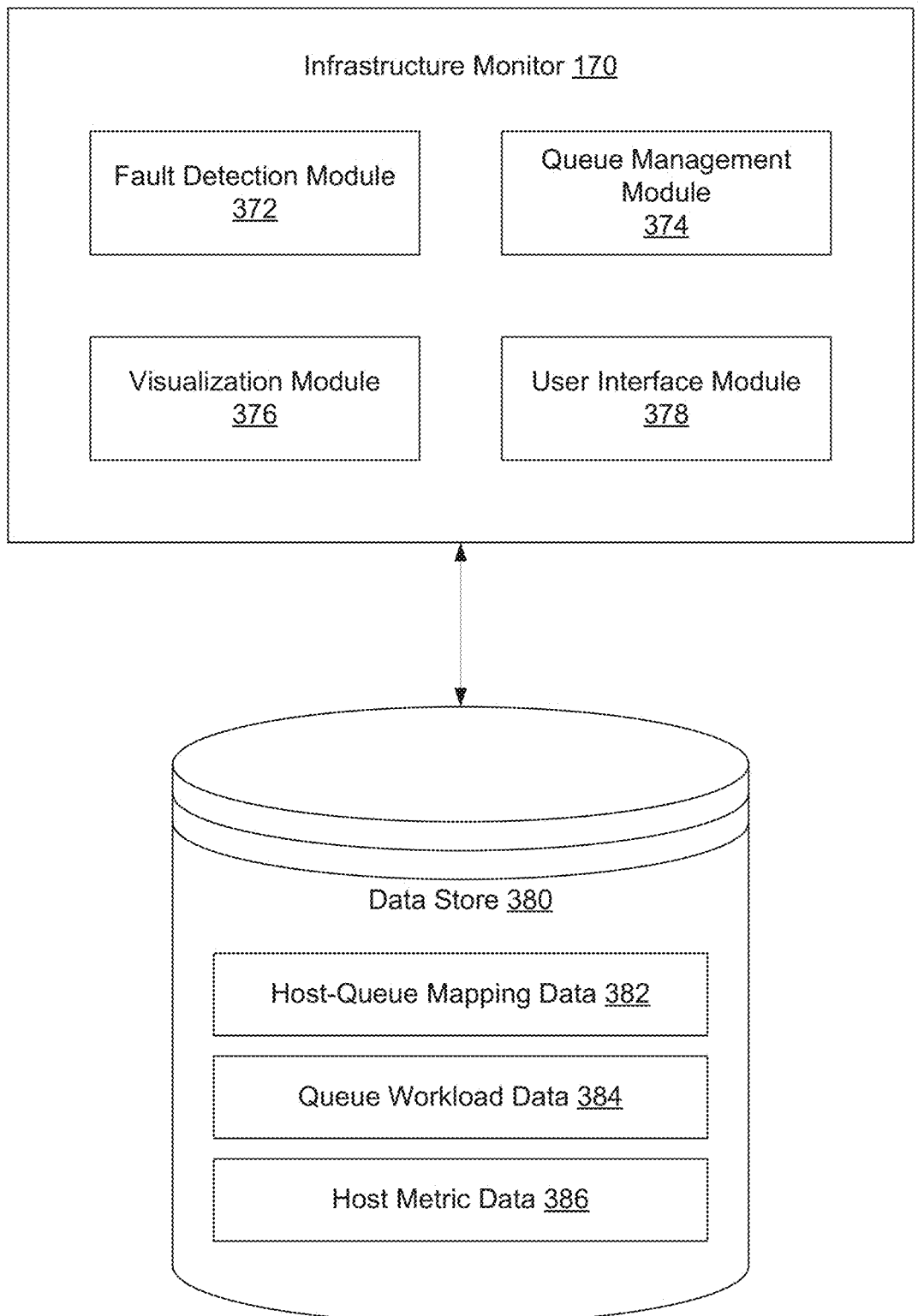
FIG. 3 is a block diagram illustrating an infrastructure monitor, according to an embodiment.

FIG. 3 is a block diagram illustrating an infrastructure monitor, according to an embodiment. In one embodiment, infrastructure monitor 170 includes fault detection module 372, queue management module 374, visualization module 376 and user interface module 378. This arrangement of modules and components may be a logical separation, and in other embodiments, these modules or other components can be combined together or separated in further components, according to a particular implementation. The embodiment of infrastructure monitor 170 illustrated in FIG. 3 may be representative of any instances of infrastructure monitor 170, discussed above with respect to FIGS. 1 and 2. In one embodiment, data store 380 is connected to infrastructure monitor 170 and includes host-queue mapping data 382, queue workload data 384 and host metric data 386. In one implementation, a single physical machine may include both infrastructure monitor 170 and data store 380. In another embodiment, data store 380 may be external to the physical machine, and may be connected over a network or other connection. In other implementations, infrastructure monitor 170 may include different and/or additional components which are not shown to simplify the description. Data store 380 may be embodied on one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

In one embodiment, fault detection module 372 can detect a fault on one of host computers 210. In one embodiment, fault detection module 372 continuously or periodically monitors one or more metrics, conditions, statuses, alerts, etc. of host computers 210 to determine a state of health of each of host computers 210. Each of host computers 210 may be running one or more services, such as system level service or an application level service. If any one of these services goes down or suffers an interruption in its operability, fault detection module 372 may determine that a fault occurred on the corresponding host computer. In one embodiment, a hardware error or loss of power on the host computer itself may constitute a fault detected by fault detection module 372. In another embodiment, each host computer may have a number of alerts defined (e.g., when certain metrics reach a designated threshold) which, when triggered, may cause a fault detected by fault detection module 372.

In one embodiment, queue management module 374 identifies a first subset of queues 250 associated with a particular host computer (e.g., host computer 110A) and determines a workload present on the first subset of queues. In one embodiment, queue management module 374 maintains host-queue mapping data 382 in data store 380. Host-queue mapping data 382 may include a list, table, array or other data structure including entries or elements defining the relationship between host computers 210 and queues 250. For example, host-queue mapping data 382 can include an indication of which host computers 210 listen to each queue 250 and/or which queues 250 are listed to be each host computer 210. Upon receiving notification of a fault on a particular host computer from fault detection module 372, queue management module 374 can consult host-queue mapping data 382 to identify which queues 250 are associated with the host computer that suffered the fault. In one embodiment, queue management module 374 also maintains queue workload data 384 in data store 380. Queue workload data 384 may include log information or tracking data representing activity on each of queues 250 over a certain period of time. For example, the activity can be represented by a number of jobs or queries placed on a given queue within the last hour, day, week, etc. After detecting which queues 250 are associated with the host computer that suffered the fault, queue management module 374 can consult queue workload data 384 to determine a workload present on those queues.

In one embodiment, visualization module 376 generates a single visualization to provide the indication of the fault on the first host computer, the first subset of the plurality of queues impacted by the fault, and the workload present on the first subset of the plurality of queues. As will be described in more detail below, the single visualization may include a first component to present status information corresponding to each of the plurality of host computers 210. In one embodiment, the first component is presented as a substantially circular ring having separate indication of one or more metric values corresponding to each of the plurality of host computers. The metric values may be obtained from host metric data 386 stored in data store 380. Host metric data 386 may include information about host computers 210 including, for example, processor, disk and memory usage data, uploaded file sizes, a number of files uploaded, parsed file sizes, pending job counts, job wait times, active job counts, service errors, job runtime data, etc. In addition, the single visualization may further include a second component to present status information corresponding to each of the plurality of queues 250. In one embodiment, the second component is presented as a heat map, arranged within the substantially circular ring, and configured to provide an indication of a volume of jobs received at each of the plurality of queues 250 within a set period of time. The single visualization may include a mapping between the first component and the second component to indicate which of the plurality of queues 250 are associated with each of the plurality of host computers 210.

In one embodiment, user interface module 378 causes presentation of the visualization generated by visualization module 376. In one embodiment, user interface module 378 can further receive user input including a selection of a first metric view, the selection defining a first metric and a view type. In response, visualization module 376 can determine metric data associated with the first metric for each of the plurality of host computers from host metric data 386 and update the single visualization to present the metric data according to the selected view type. User interface module 378 may present the updated visualization.

Figure 4:
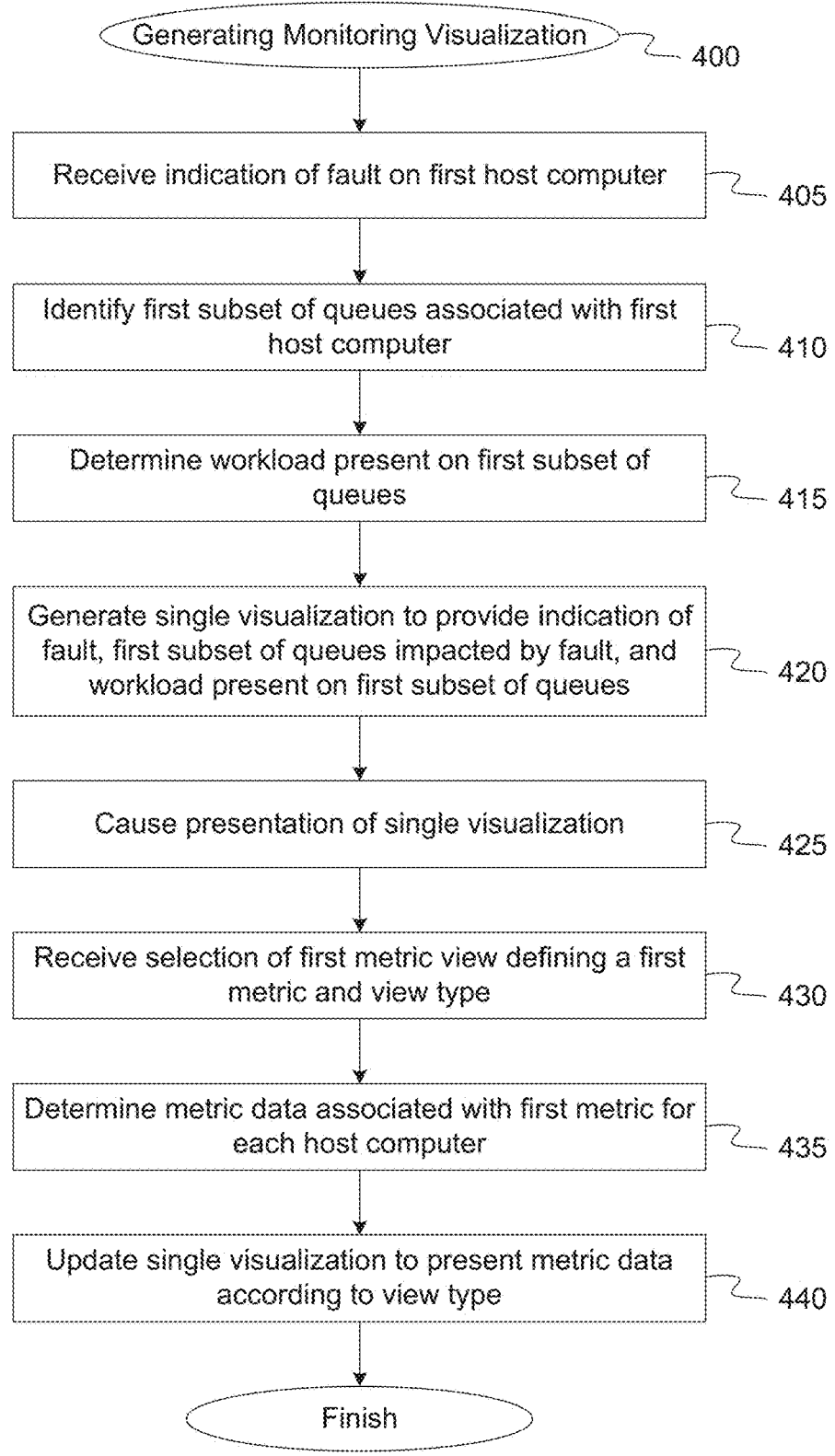
FIG. 4 is a flow diagram illustrating a method of generating a monitoring visualization, according to an embodiment.

FIG. 4 is a flow diagram illustrating a method of generating a monitoring visualization, according to an embodiment. The method 400 may be performed by processing logic that comprises hardware (e.g., circuitry, dedicated logic, programmable logic, microcode, etc.), software, firmware, or a combination thereof. The processing logic is configured to generate and present a single visualization to provide an indication of a fault on the first host computer, a first subset of a plurality of queues impacted by the fault, and a workload present on the first subset of the plurality of queues. In one embodiment, method 400 may be performed by infrastructure monitor 170, as shown in FIGS. 1 and 3.

Referring to FIG. 4, at block 405, method 400 receives an indication of a fault on a first host computer of a plurality of host computers, wherein each of the plurality of host computers is associated with a different subset of a plurality of queues, and wherein each of the plurality of queues are serviced by a different subset of the plurality of host computers. In one embodiment, fault detection module 372 can detect a fault on one of host computers 210. In one embodiment, fault detection module 372 continuously or periodically monitors one or more metrics, conditions, statuses, alerts, etc. of host computers 210 to determine a state of health of each of host computers 210.

At block 410, method 400 identifies a first subset of the plurality of queues associated with the first host computer. In one embodiment, upon receiving notification of a fault on a particular host computer from fault detection module 372, queue management module 374 can consult host-queue mapping data 382 to identify which queues 250 are associated with the host computer that suffered the fault.

At block 415, method 400 determines a workload present on the first subset of the plurality of queues. In one embodiment, after detecting which queues 250 are associated with the host computer that suffered the fault, queue management module 374 can consult queue workload data 384 to determine a workload present on those queues.

At block 420, method 400 generates a visualization. In one embodiment, visualization module 376 generates the single visualization to provide the indication of the fault on the first host computer, the first subset of the plurality of queues impacted by the fault, and the workload present on the first subset of the plurality of queues.

At block 425, method 400 causes presentation of the single visualization. At block 430, method 400 receives a selection of a first metric view, the selection defining a first metric and a view type. In one embodiment, user interface module 378 presents the visualization on a display device and can further receive user input including the selection of the first metric view.

At block 435, method 400 determines metric data associated with the first metric for each of the plurality of host computers. At block 440, method 400 updates the single visualization to present the metric data according to the view type. In response to receiving the selection, visualization module 376 can determine the metric data associated with the first metric for each of the plurality of host computers from host metric data 386 and update the single visualization to present the metric data according to the selected view type. User interface module 378 may present the updated visualization.

FIGS. 5A-5H are diagrams illustrating example implementations of visualizations for monitoring infrastructure entities, according to some embodiments. The different visualizations can range from an alert-only view, where a number of metrics associated with each host computer are summarized into a single status indication, to different metric views where additional details one or more specifically selected metrics are presented. The particular view presented in a current visualization can be selected by the user, who is allowed to specify both which metrics are presented and a view type indicating how the corresponding metric data will be displayed in the visualization.

Figure 5A:
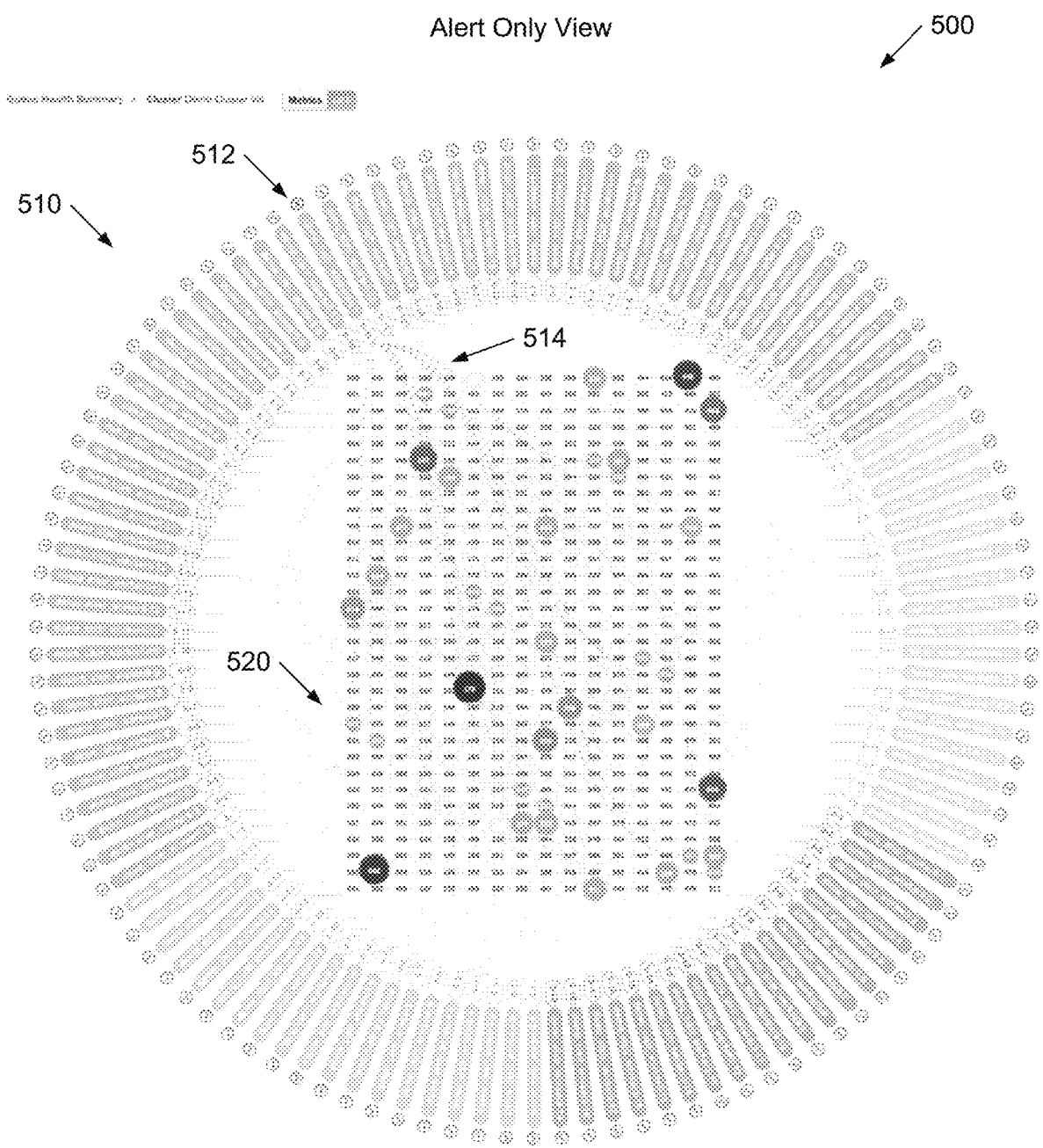
FIGS. 5A-5H are diagrams illustrating example implementations of visualizations for monitoring infrastructure entities, according to some embodiments.

FIG. 5A illustrates a visualization displaying an alert only view. In one embodiment, the visualization 500 includes a first component 510 to present status information corresponding to each of the plurality of host computers 210. In one embodiment, the first component 510 is presented as a substantially circular ring. In addition, the visualization 500 may further include a second component 520 to present status information corresponding to each of the plurality of queues 250. In one embodiment, the second component 520 is presented as a heat map, arranged within the substantially circular ring, and configured to provide an indication of a volume of jobs received at each of the plurality of queues 250 within a set period of time.

In this view, each host computer in the first component 510 (i.e., the substantially circular ring) is identified by a short form of its name preceding its original host name. In one embodiment, the short form is represented by (the rack number—an index number of the host computer within the tack). In one embodiment, the color of each host computer represents the rack where it is located. All of the host computers may be displayed as sorted by the rack number and further by the index of the host computer within its rack. The short name of the host computer can be used to identify the host computer in the subsequent metric views where host computer metrics are visualized, instead of using the host computer's original name. A tick symbol (e.g., a green ✓ or a red X) next to the host computer name can represent whether there are any ongoing alerts related to the host computer.

In one embodiment, the visualization may include a mapping between the first component 510 and the second component 520 to indicate which of the plurality of queues 250 are associated with each of the plurality of host computers 210. For example, the indication 512 of a host computer having short name (6-11) includes a red X meaning that the host computer is in bad health. As a result, the broken links 514 displayed in orange color point to the queues in second component 520, which are impacted by the host computer in bad health. Of the remaining queues in second component 520, the fill opacity and size of each blue-colored circle indicates the queue workload over the last hour, for example. Queues that are unused or healthy may not have any corresponding circle. The visualization 500 allows a user or administrator viewing the visualization to easy see which and/or how many host computers are in bad health and which queues are impacted. The heat map in second component 520 conveys whether any of the impacted queues have a high workload and thus, whether the host computer being in bad health will have any significant consequences with respect to customer performance.

Figure 5B:
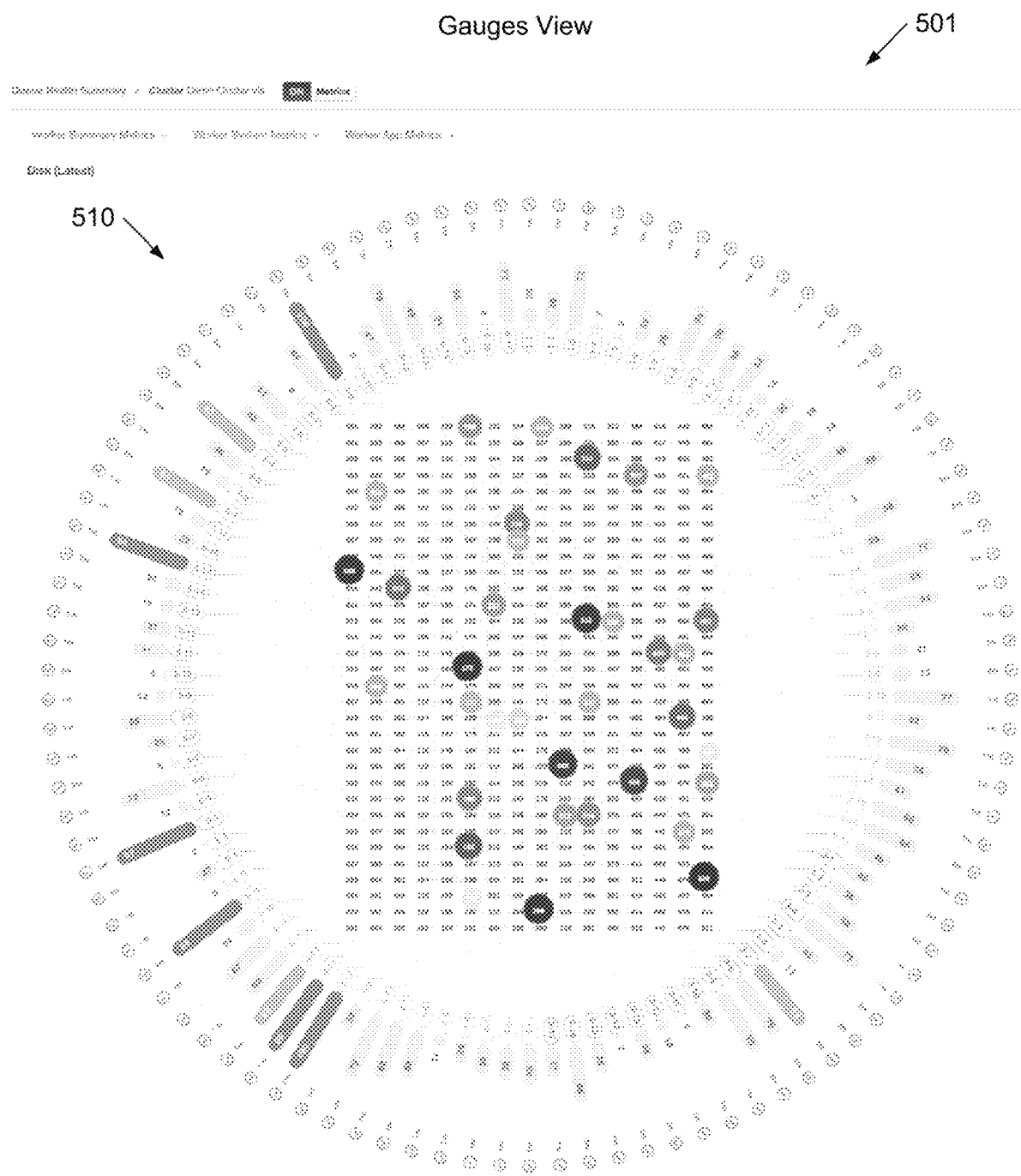

FIG. 5B illustrates a visualization displaying a gauges view. In one embodiment, the visualization 501 presents one metric in the first component 510 for each host computer instead of the host computer's original name. In the illustrated embodiment, the displayed metric is disk usage, but any other metric could be similarly presented. In the first component 510, each host computer is represented by a gauge, where the width of the gauge indicates a percentage of usage of the disk space on the corresponding host machine. The percentage is also displayed numerically. In one embodiment, the gauges are color coded to indicate whether the metric value is in a particular zone defined by threshold values. For example, orange bars may indicate that the metric value is in a warning zone and red bars may indicate the metric value is in a critical zone. In one embodiment, next to each metric representation is a short text block such as "1 m" or "2 m" indicating how recently the metric value was updated. As described above, the check mark at the end of each gauge represents whether there are alerts on the corresponding host computer.

Figure 5C:
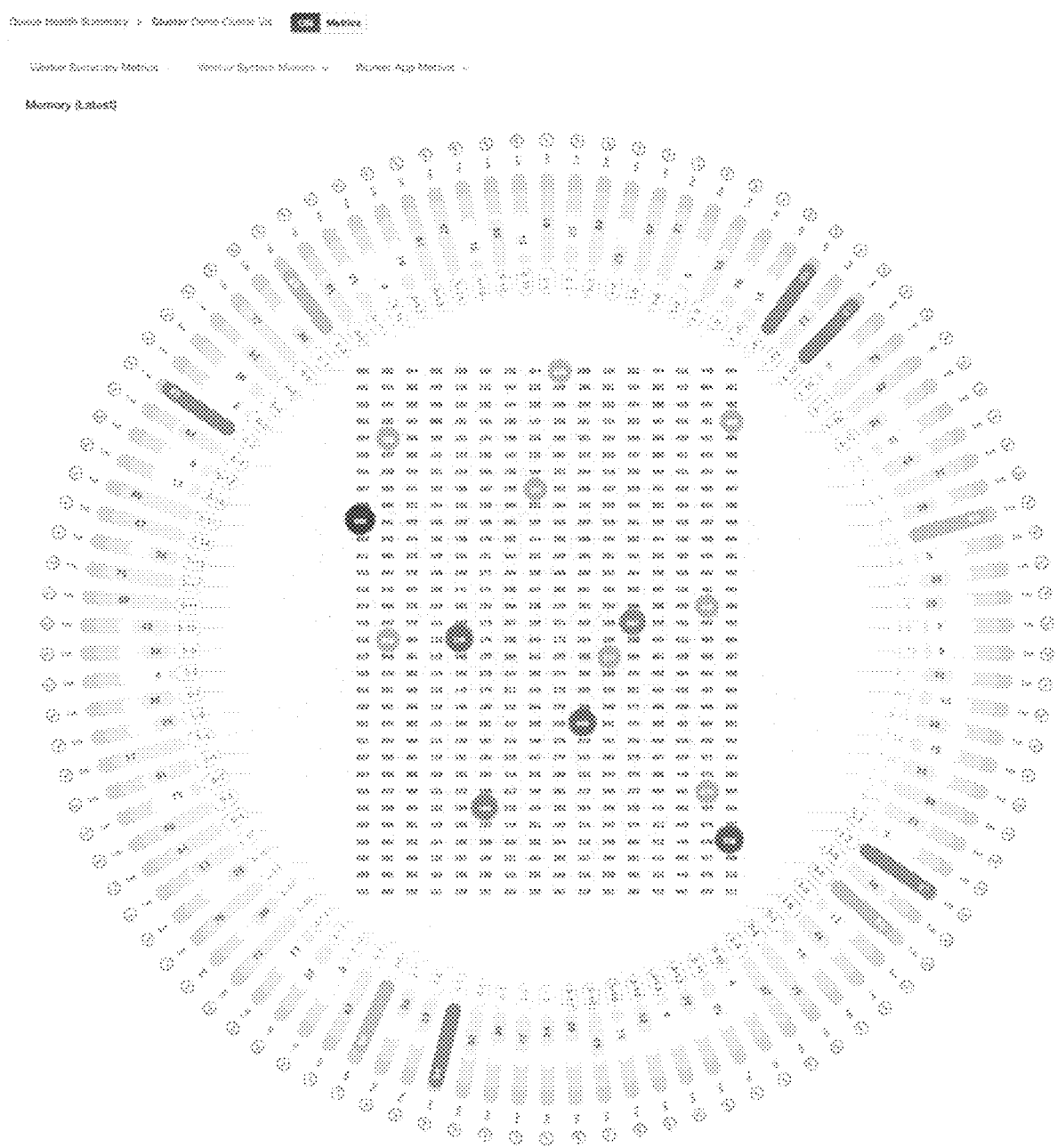

FIG. 5C illustrates a visualization displaying a bullet chart view. In one embodiment, the visualization 502 is similar to the visualization 501 depicted in FIG. 5B (i.e., the gauge view), except that in visualization 502, each gauge has 3 further bars in different shades of gray, to represent the certain zones qualitatively, (e.g., normal, warning and critical). The gray bars represent the thresholds that define the different zones and allow the user to more clearly see how close the current value is to a particular zone boundary.

Figure 5D:
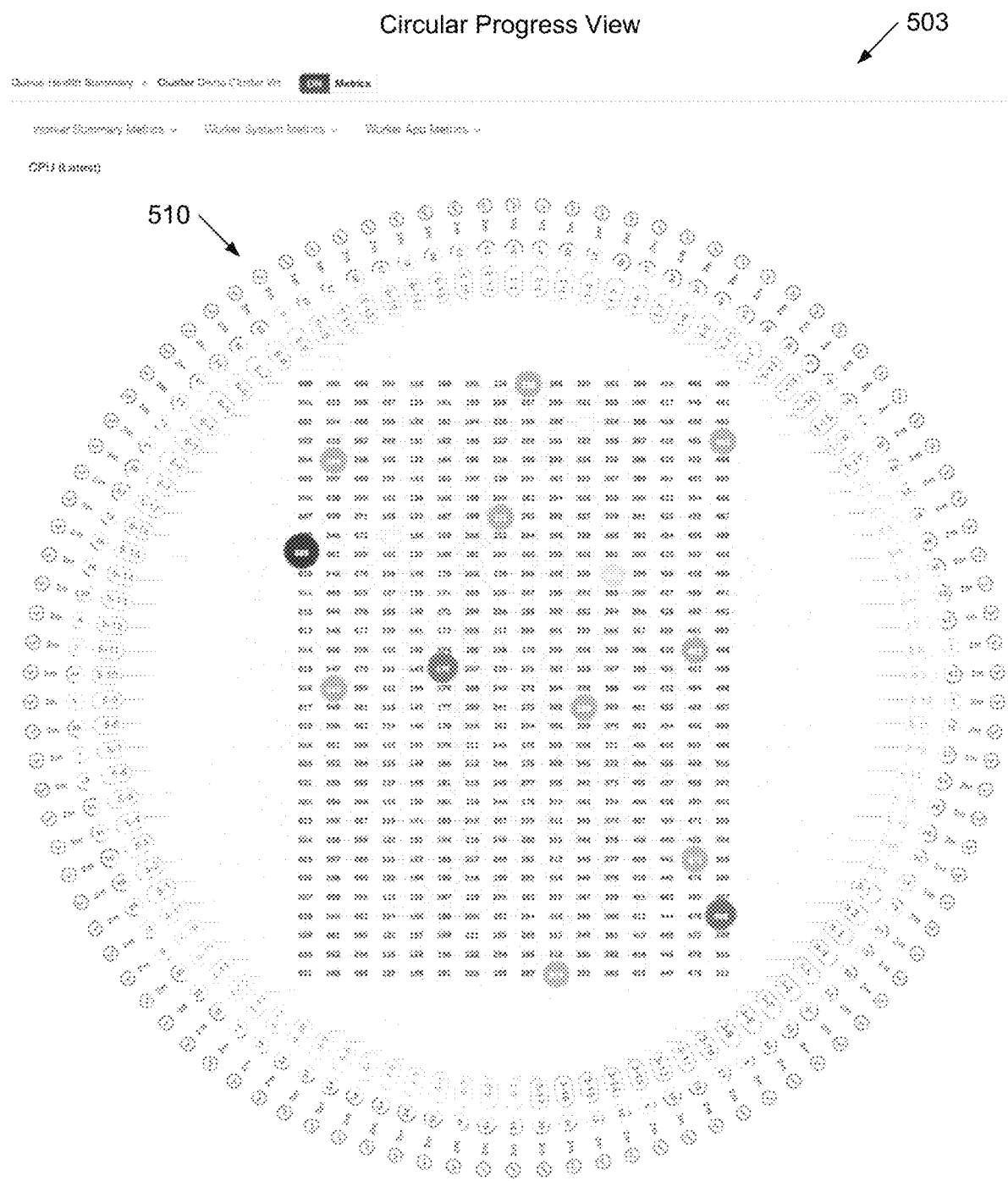

FIG. 5D illustrates a visualization displaying a circular progress view. In one embodiment, the visualization 503 presents each metric value in first component 510 as a circular progress bar, in place of the previously displayed gauge. In one embodiment, the circular progress bar has a colored bar that increases in a clockwise fashion around the circle as the corresponding metric value also increases. The color of the bar changes to indicate whether the metric value is in a particular zone defined by threshold values. In addition, each circular progress bar also presents a numerical indication of the corresponding metric value at the center.

Figure 5E:
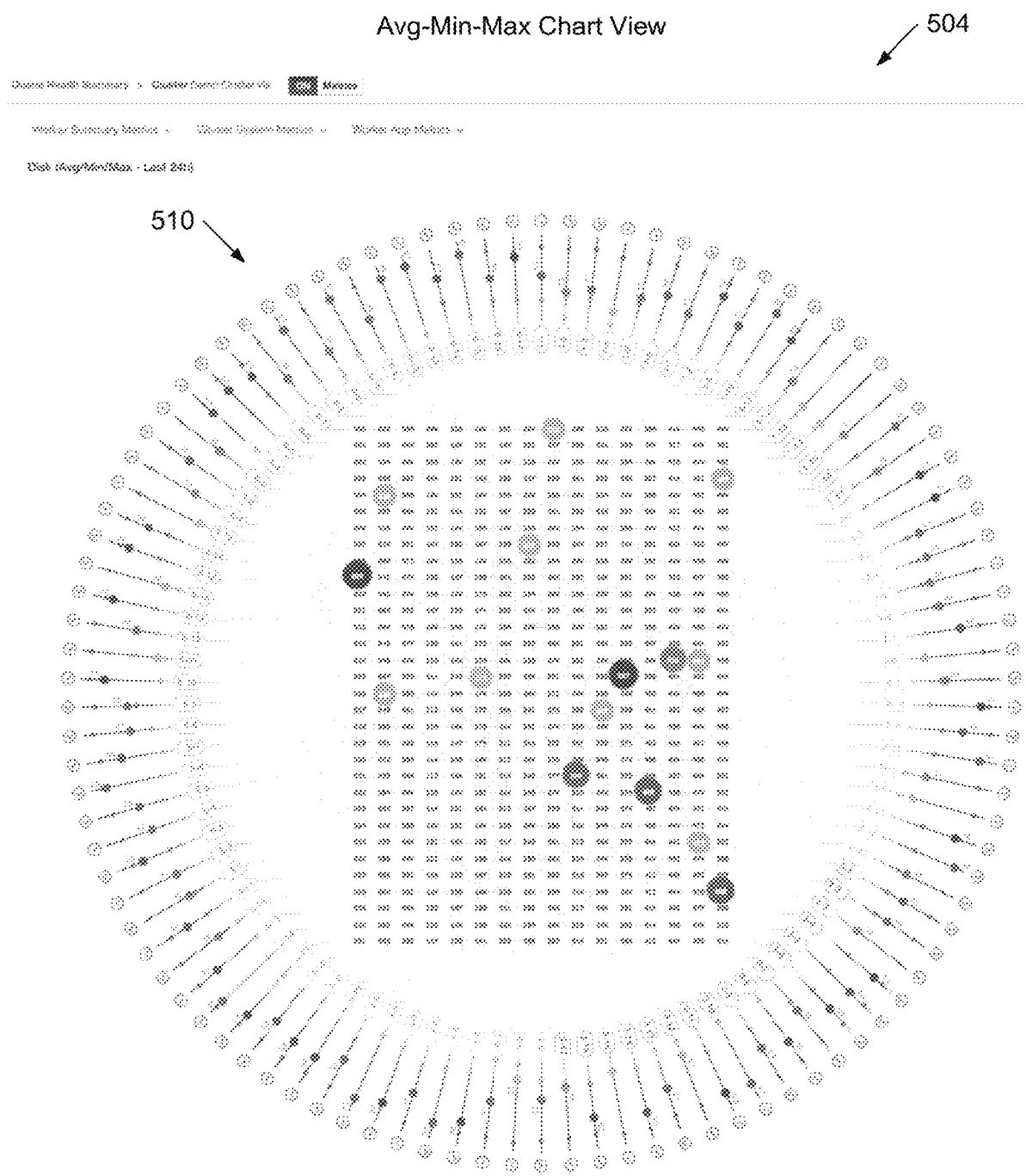

FIG. 5E illustrates a visualization displaying an average-minimum-maximum chart view. In one embodiment, the visualization 504 presents the minimum, average, and maximum value of a given metric over some fixed period of time (i.e., the previous N hours). In one embodiment, each metric chart in first component 510 is composed of a line divided into 3 ranges or zones, such as low, normal and critical, represented by green, blue and red colors respectively. Apart from the line, the chart can include three filled circles: two small circles indicating the minimum and maximum values and one larger circle indicating the average value. In one embodiment, each of these circles assumes the green, blue or red color based on the ranges in which the corresponding values fall. This view indicates an approximate range of a particular metric value in the given period of time as opposed to indicating the exact minimum, average and maximum values of the metric. In one embodiment, the numeric value of the average for the metric is indicated in text next to the circle representing the average value.

Figure 5F:
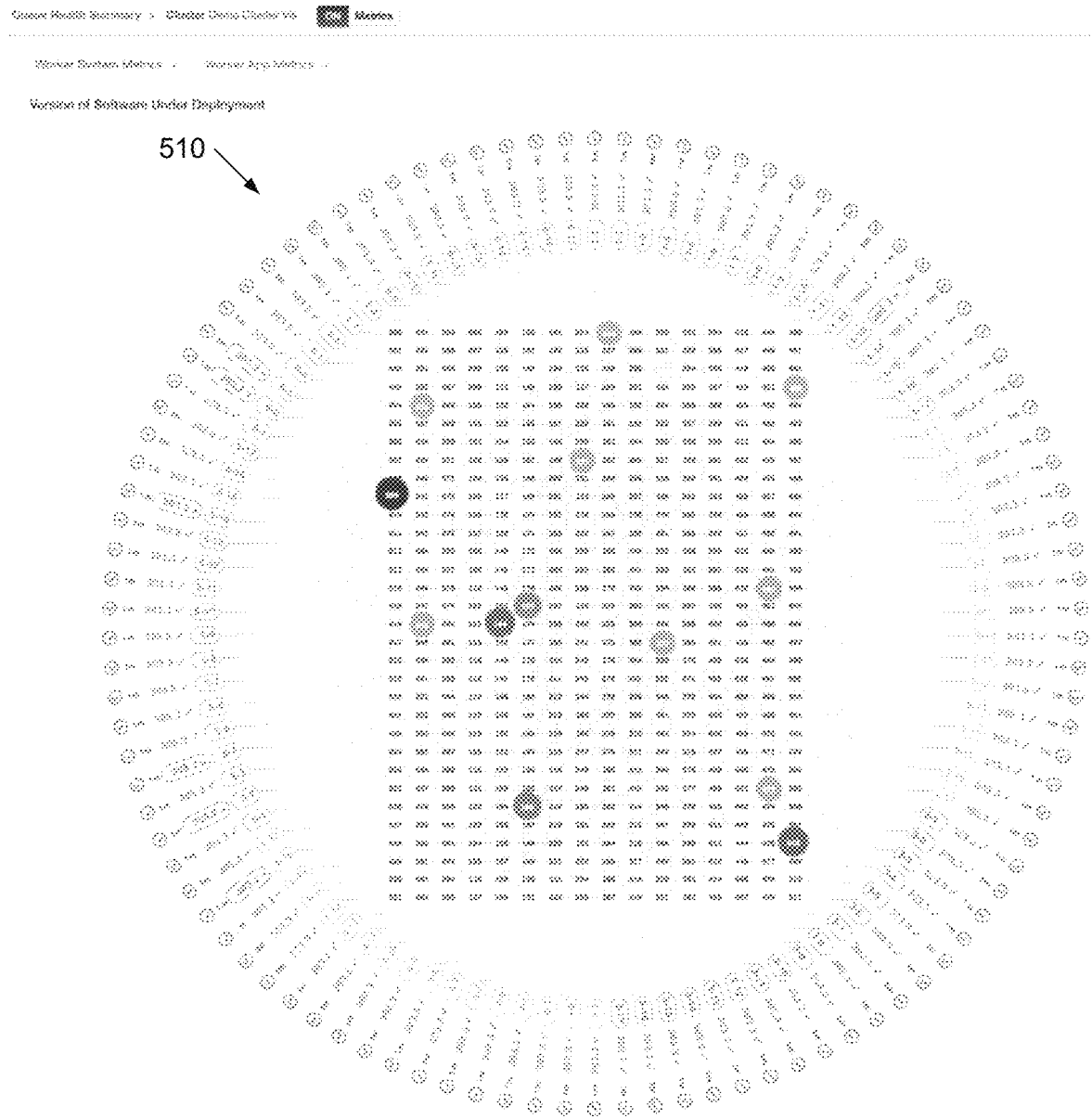

FIG. 5F illustrates a visualization displaying a plain numeric metric view. In one embodiment, the visualization 505 depicts a simple numeric metric value for each host computer in the first component 510. This can be useful to represent metrics, such as version of given software component, etc. In one embodiment, a check mark present with each version number to indicate that the host computer has the right version of the current software component. For host computers that have an out of data software component, an X may be present instead of the check and the host computer may be highlighted in a different color (e.g., red).

Figure 5G:
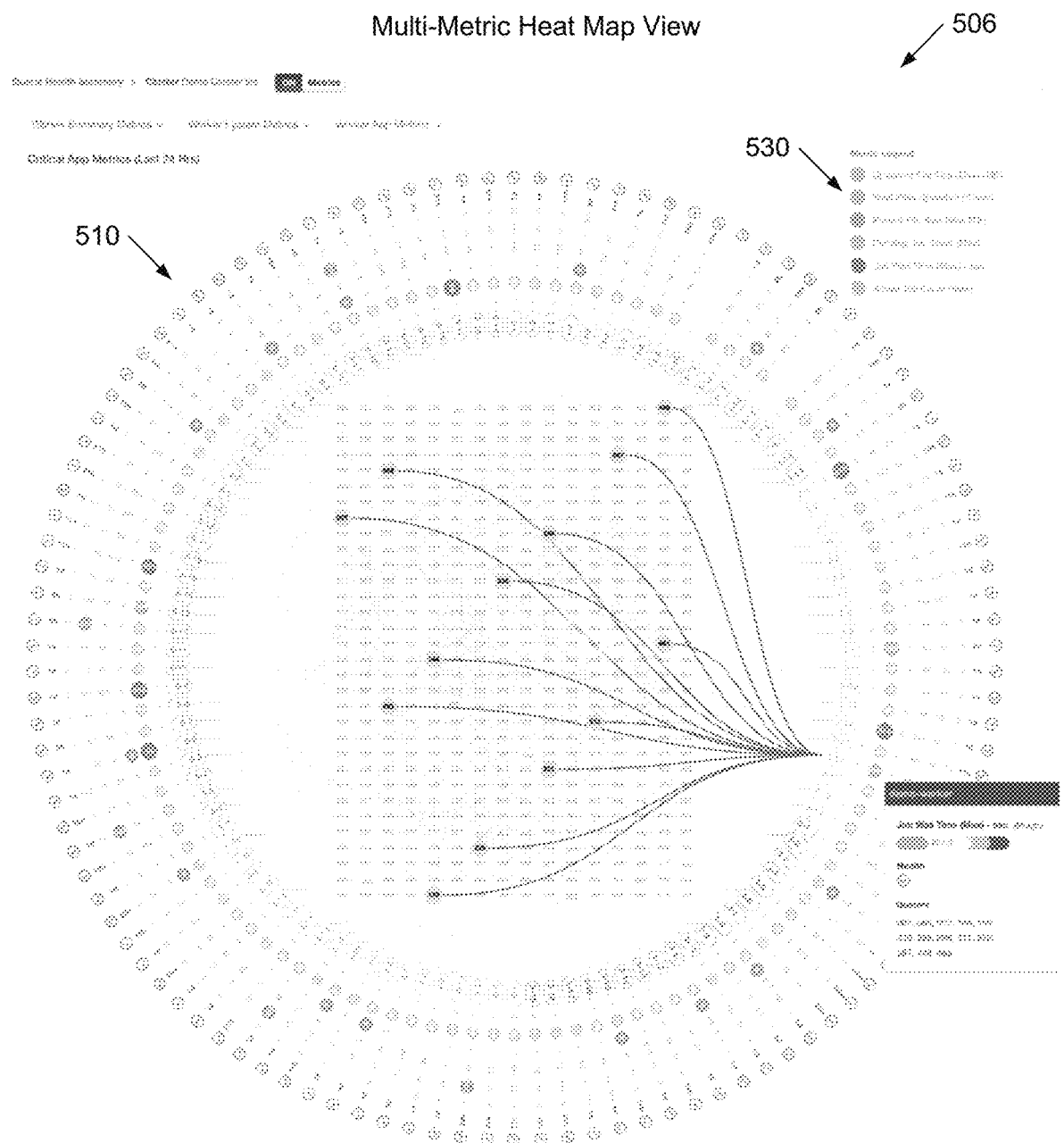

FIG. 5G illustrates a visualization displaying a multi-metric heat-map view. In one embodiment, the visualization 506 presents multiple metric values in a single view using a heat map. In many real-world monitoring scenarios, the user or administrator may be interested in visualizing multiple related metrics (e.g., system metrics and/or application metrics) in one view as opposed to a single metric. In this view, multiple metrics can be presented as concentric heat maps (i.e., one heat map each per metric) in the first component 510. In one embodiment, the user can toggle the metric name in the legend 530 to highlight specific metric value across all host computers. Each metric heat map may indicate up to five ranges of values. For example, metric values <20% of the maximum possible value can be displayed as plain numbers in the corresponding metric color. Metric values >20% but <60% of the maximum possible value can be shown in circles with a fill color as the corresponding metric color and opacity indicating the metric value. Metric values >60% but <80% of the maximum possible value can be shown as circles with a fill color of orange. Metric values exceeding 80% of the maximum possible value are shown as circles with a fill color of red. In one embodiment, highlighting each metric does not result in the loss of the heat property for each metric value. In response to a mouse-over or other selection of each metric value, the visualization 506 can show each metric value as a bullet chart, as described above.

Figure 5H:
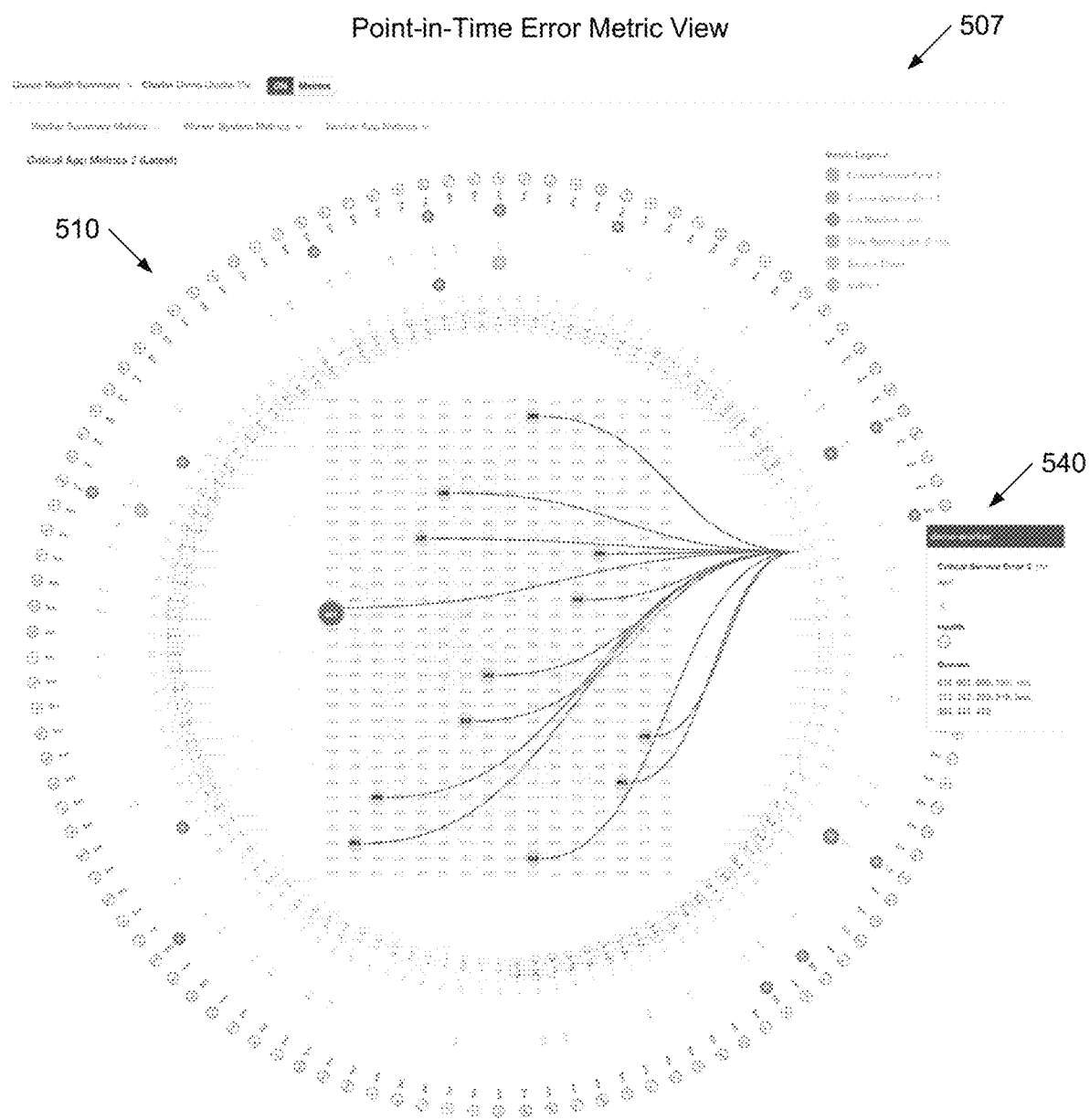

FIG. 5H illustrates a visualization displaying a point-in-time error metric view. In one embodiment, the visualization 507 is a variant of the visualization 506 shown in FIG. 5G, but where critical service errors can be illustrated using X marks filled in a red color, along with system/application metrics as heat maps. In one embodiment, in this or any other visualization, in response to a user hovering over, highlighting, clicking-on, tapping or otherwise selecting a particular host computer, the visualization can present additional details about the host computer in a pop-up window 540. For example, the pop-up window 540 can include additional details about the service error represented by the red X, and indication of which queues are associated with that host computer, and/or any other relevant information.

II. Example System Overview

The following description is of one example of a system in which the features described above may be implemented. The components of the system described below are merely one example and should not be construed as limiting. The features described above with respect to FIGS. 1-5 may be implemented in any other type of computing environment, such as one with multiple servers, one with a single server, a multi-tenant server environment, a single-tenant server environment, or some combination of the above.

Figure 6A:
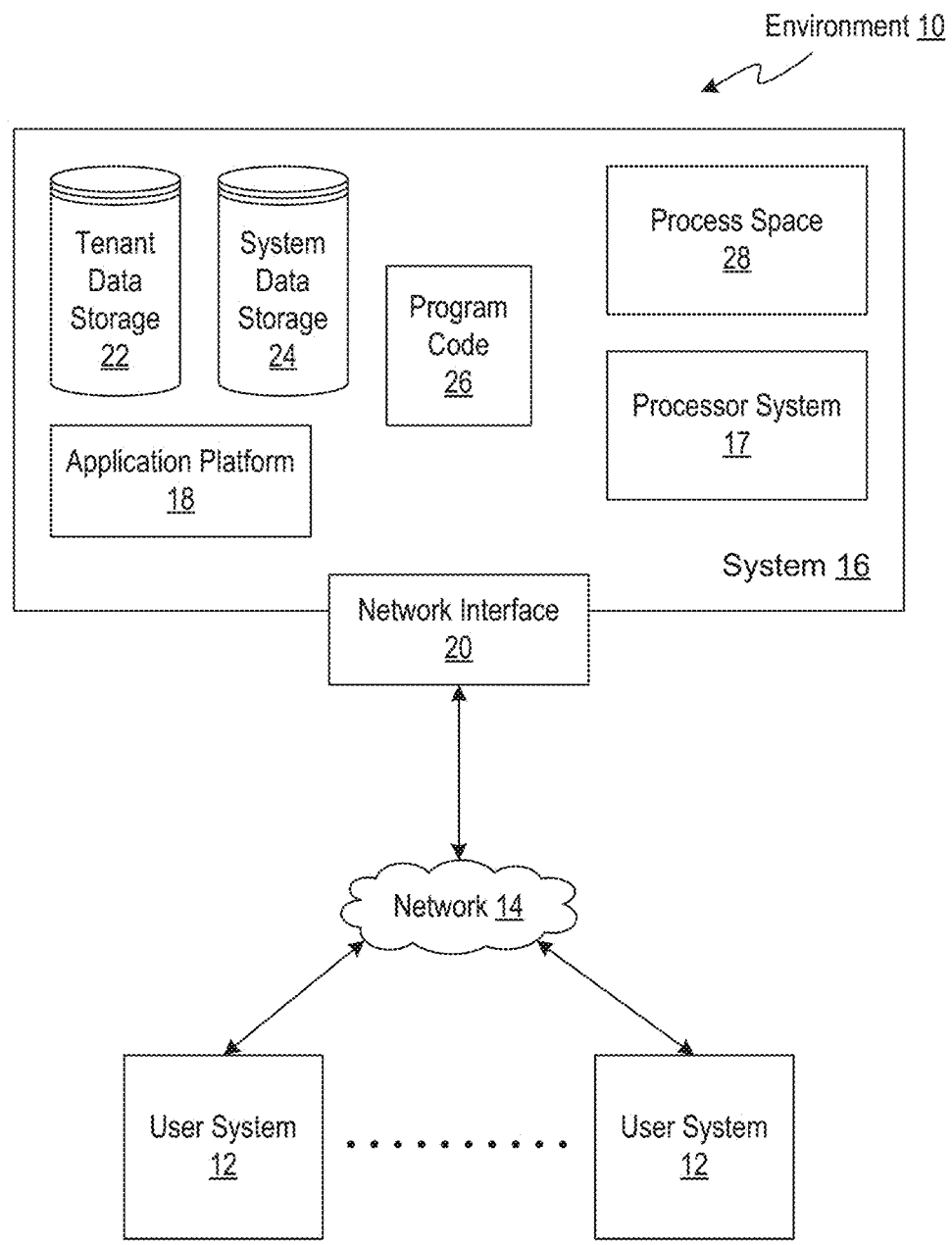
FIG. 6A is a block diagram illustrating an example environment in which an on-demand database service can be used, according to some embodiments.

FIG. 6A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 6B:
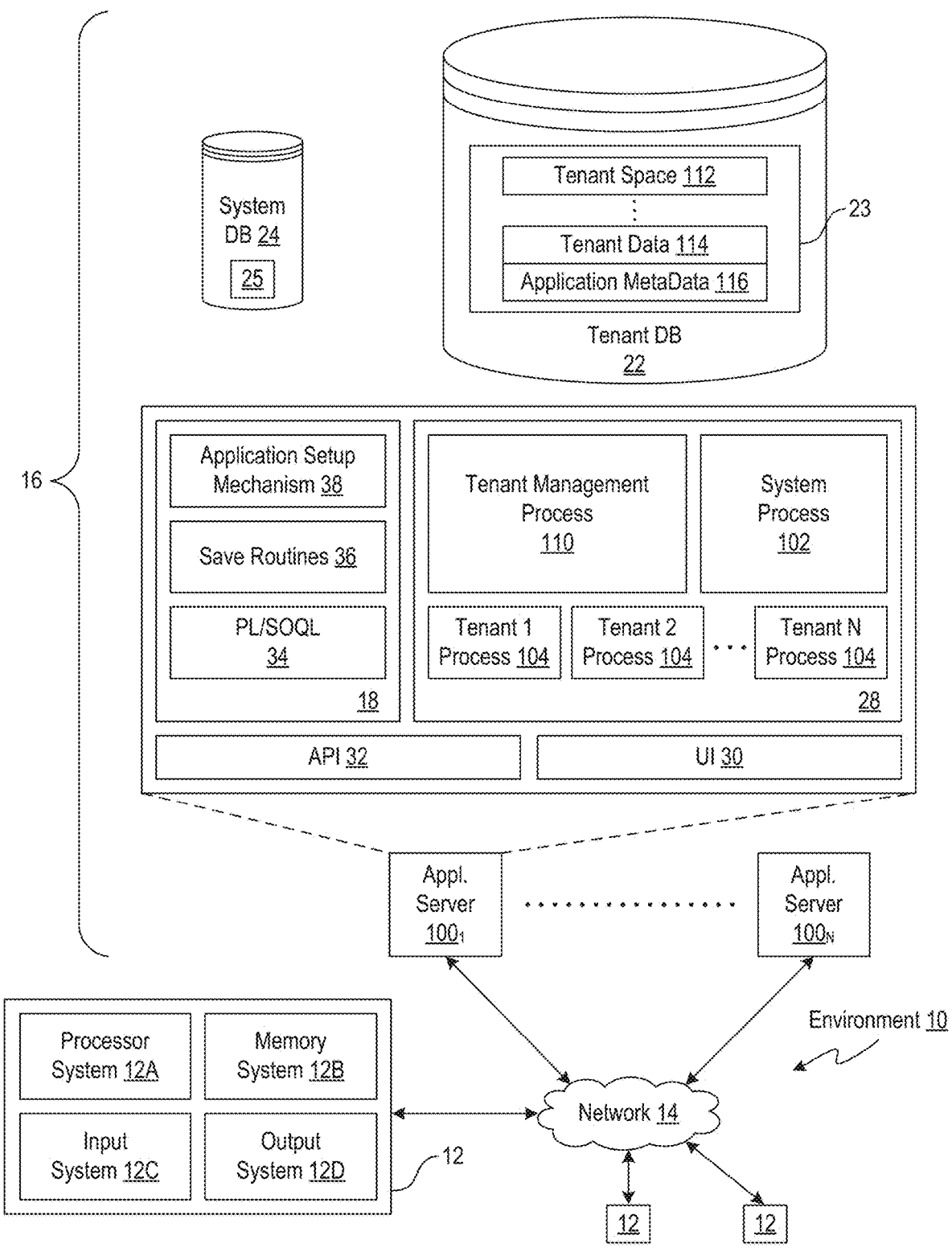
FIG. 6B is a block diagram illustrating an example implementation of elements of FIG. 6A and example interconnections between these elements according to some embodiments.

FIG. 6B shows a block diagram of example implementations of elements of FIG. 6A and example interconnections between these elements according to some implementations. That is, FIG. 6B also illustrates environment 10, but FIG. 6B, various elements of the system 16 and various interconnections between such elements are shown with more specificity according to some more specific implementations. Additionally, in FIG. 6B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 6B, the network interface 20 is implemented as a set of HTTP application servers $100_1$-$100_N$. Each application server 800, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 812, which can be physically or logically arranged or divided. Within each tenant storage space 812, user storage 814 and application metadata 816 can similarly be allocated for each user. For example, a copy of a user's most recently used (MRU) items can be stored to user storage 814. Similarly, a copy of MRU items for an entire organization that is a tenant can be stored to tenant storage space 812.

The process space 28 includes system process space 802, individual tenant process spaces 804 and a tenant management process space 810. The application platform 18 includes an application setup mechanism 38 that supports application developers' creation and management of applications. Such applications and others can be saved as metadata into tenant database 22 by save routines 36 for execution by subscribers as one or more tenant process spaces 804 managed by tenant management process 810, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 16 of FIG. 6B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 800 can be communicably coupled with tenant database 22 and system database 24, for example, having access to tenant data 23 and system data 25, respectively, via a different network connection. For example, one application server $800_1$ can be coupled via the network 14 (for example, the Internet), another application server $800_{N-1}$ can be coupled via a direct network link, and another application server $800_N$ can be coupled by yet a different network connection. Transfer Control Protocol and Internet Protocol (TCP/IP) are examples of typical protocols that can be used for communicating between application servers 800 and the system 16. However, it will be apparent to one skilled in the art that other transport protocols can be used to optimize the system 16 depending on the network interconnections used.

In some implementations, each application server 800 is configured to handle requests for any user associated with any organization that is a tenant of the system 16. Because it can be desirable to be able to add and remove application servers 800 from the server pool at any time and for various reasons, in some implementations there is no server affinity for a user or organization to a specific application server 800. In some such implementations, an interface system implementing a load balancing function (for example, an F5 Big-IP load balancer) is communicably coupled between the application servers 800 and the user systems 12 to distribute requests to the application servers 800. In one implementation, the load balancer uses a least-connections algorithm to route user requests to the application servers 800. Other examples of load balancing algorithms, such as round robin and observed-response-time, also can be used. For example, in some instances, three consecutive requests from the same user could hit three different application servers 800, and three requests from different users could hit the same application server 800. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 800 to request and update system-level and tenant-level data from the system 16. Such requests and updates can involve sending one or more queries to tenant database 22 or system database 24. The system 16 (for example, an application server 800 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7A:
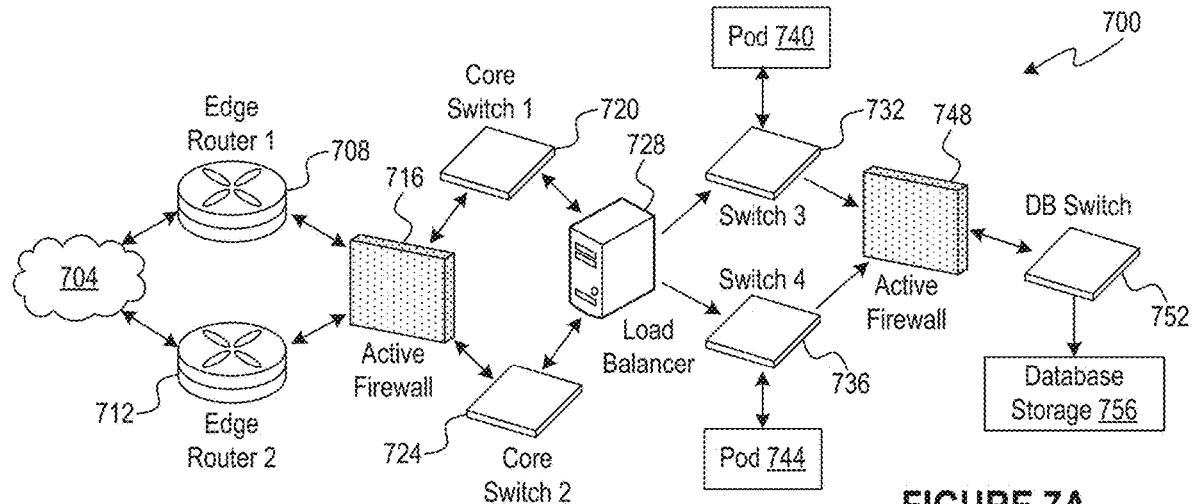
FIG. 7A shows a system diagram of example architectural components of an on-demand database service environment, according to some embodiments.

FIG. 7A shows a system diagram illustrating example architectural components of an on-demand database service environment 700 according to some implementations. A client machine communicably connected with the cloud 704, generally referring to one or more networks in combination, as described herein, can communicate with the on-demand database service environment 700 via one or more edge routers 708 and 712. A client machine can be any of the examples of user systems 12 described above. The edge routers can communicate with one or more core switches 720 and 724 through a firewall 716. The core switches can communicate with a load balancer 728, which can distribute server load over different pods, such as the pods 740 and 744. The pods 740 and 744, which can each include one or more servers or other computing resources, can perform data processing and other operations used to provide on-demand services. Communication with the pods can be conducted via pod switches 732 and 736. Components of the on-demand database service environment can communicate with database storage 756 through a database firewall 748 and a database switch 752.

Figure 7B:
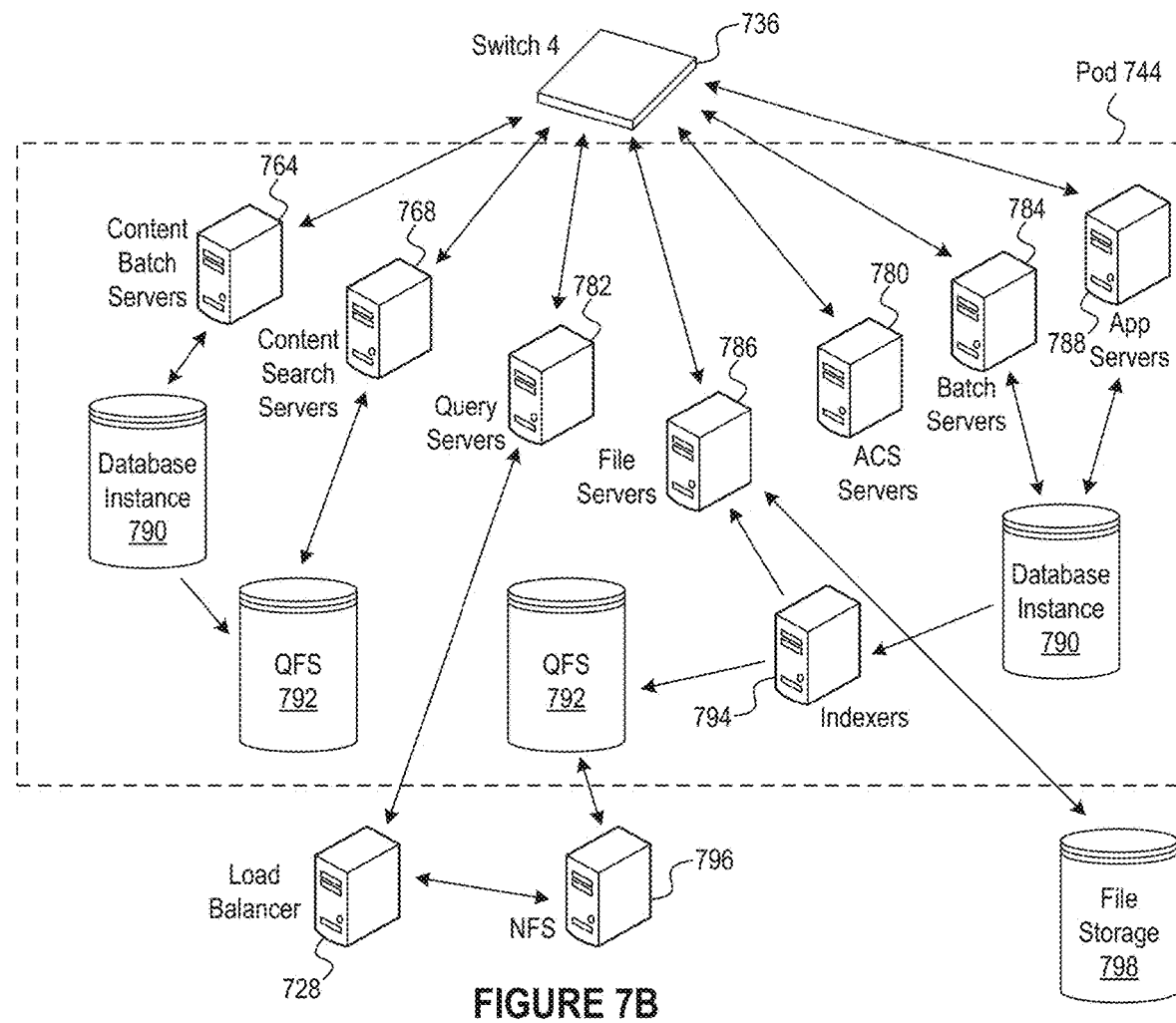
FIG. 7B shows a system diagram further illustrating example architectural components of an on-demand database service environment, according to some embodiments.

As shown in FIGS. 7A and 7B, accessing an on-demand database service environment can involve communications transmitted among a variety of different hardware or software components. Further, the on-demand database service environment 700 is a simplified representation of an actual on-demand database service environment. For example, while only one or two devices of each type are shown in FIGS. 7A and 7B, some implementations of an on-demand database service environment can include anywhere from one to several devices of each type. Also, the on-demand database service environment need not include each device shown in FIGS. 7A and 7B, or can include additional devices not shown in FIGS. 7A and 7B.

Additionally, it should be appreciated that one or more of the devices in the on-demand database service environment 700 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 704 is intended to refer to a data network or multiple data networks, often including the Internet. Client machines communicably connected with the cloud 704 can communicate with other components of the on-demand database service environment 700 to access services provided by the on-demand database service environment. For example, client machines can access the on-demand database service environment to retrieve, store, edit, or process information. In some implementations, the edge routers 708 and 712 route packets between the cloud 704 and other components of the on-demand database service environment 700. For example, the edge routers 708 and 712 can employ the Border Gateway Protocol (BGP). The BGP is the core routing protocol of the Internet. The edge routers 708 and 712 can maintain a table of IP networks or 'prefixes', which designate network reachability among autonomous systems on the Internet.

In some implementations, the firewall 716 can protect the inner components of the on-demand database service environment 700 from Internet traffic. The firewall 716 can block, permit, or deny access to the inner components of the on-demand database service environment 700 based upon a set of rules and other criteria. The firewall 716 can act as one or more of a packet filter, an application gateway, a stateful filter, a proxy server, or any other type of firewall.

In some implementations, the core switches 720 and 724 are high-capacity switches that transfer packets within the on-demand database service environment 700. The core switches 720 and 724 can be configured as network bridges that quickly route data between different components within the on-demand database service environment. In some implementations, the use of two or more core switches 720 and 724 can provide redundancy or reduced latency.

In some implementations, the pods 740 and 744 perform the core data processing and service functions provided by the on-demand database service environment. Each pod can include various types of hardware or software computing resources. An example of the pod architecture is discussed in greater detail with reference to FIG. 7B. In some implementations, communication between the pods 740 and 744 is conducted via the pod switches 732 and 736. The pod switches 732 and 736 can facilitate communication between the pods 740 and 744 and client machines communicably connected with the cloud 704, for example via core switches 720 and 724. Also, the pod switches 732 and 736 may facilitate communication between the pods 740 and 744 and the database storage 756. In some implementations, the load balancer 728 can distribute workload between the pods 740 and 744. Balancing the on-demand service requests between the pods can assist in improving the use of resources, increasing throughput, reducing response times, or reducing overhead. The load balancer 728 may include multilayer switches to analyze and forward traffic.

In some implementations, access to the database storage 756 is guarded by a database firewall 748. The database firewall 748 can act as a computer application firewall operating at the database application layer of a protocol stack. The database firewall 748 can protect the database storage 756 from application attacks such as structure query language (SQL) injection, database rootkits, and unauthorized information disclosure. In some implementations, the database firewall 748 includes a host using one or more forms of reverse proxy services to proxy traffic before passing it to a gateway router. The database firewall 748 can inspect the contents of database traffic and block certain content or database requests. The database firewall 748 can work on the SQL application level atop the TCP/IP stack, managing applications' connection to the database or SQL management interfaces as well as intercepting and enforcing packets traveling to or from a database network or application interface.

In some implementations, communication with the database storage 756 is conducted via the database switch 752. The multi-tenant database storage 756 can include more than one hardware or software components for handling database queries. Accordingly, the database switch 752 can direct database queries transmitted by other components of the on-demand database service environment (for example, the pods 740 and 744) to the correct components within the database storage 756. In some implementations, the database storage 756 is an on-demand database system shared by many different organizations as described above with reference to FIG. 6A and FIG. 6B.

FIG. 7B shows a system diagram further illustrating example architectural components of an on-demand database service environment according to some implementations. The pod 744 can be used to render services to a user of the on-demand database service environment 700. In some implementations, each pod includes a variety of servers or other systems. The pod 744 includes one or more content batch servers 764, content search servers 768, query servers 782, file force servers 786, access control system (ACS) servers 780, batch servers 784, and app servers 788. The pod 744 also can include database instances 790, quick file systems (QFS) 792, and indexers 794. In some implementations, some or all communication between the servers in the pod 744 can be transmitted via the switch 736.

In some implementations, the app servers 788 include a hardware or software framework dedicated to the execution of procedures (for example, programs, routines, scripts) for supporting the construction of applications provided by the on-demand database service environment 700 via the pod 744. In some implementations, the hardware or software framework of an app server 788 is configured to execute operations of the services described herein, including performance of the blocks of various methods or processes described herein. In some alternative implementations, two or more app servers 288 can be included and cooperate to perform such methods, or one or more other servers described herein can be configured to perform the disclosed methods.

The content batch servers 764 can handle requests internal to the pod. Some such requests can be long-running or not tied to a particular customer. For example, the content batch servers 764 can handle requests related to log mining, cleanup work, and maintenance tasks. The content search servers 768 can provide query and indexer functions. For example, the functions provided by the content search servers 768 can allow users to search through content stored in the on-demand database service environment. The file force servers 786 can manage requests for information stored in the File force storage 798. The File force storage 798 can store information such as documents, images, and basic large objects (BLOBs). By managing requests for information using the file force servers 786, the image footprint on the database can be reduced. The query servers 782 can be used to retrieve information from one or more file systems. For example, the query system 782 can receive requests for information from the app servers 788 and transmit information queries to the NFS 796 located outside the pod.

The pod 744 can share a database instance 790 configured as a multi-tenant environment in which different organizations share access to the same database. Additionally, services rendered by the pod 744 may call upon various hardware or software resources. In some implementations, the ACS servers 780 control access to data, hardware resources, or software resources. In some implementations, the batch servers 784 process batch jobs, which are used to run tasks at specified times. For example, the batch servers 784 can transmit instructions to other servers, such as the app servers 788, to trigger the batch jobs.

In some implementations, the QFS 792 is an open source file system available from Sun Microsystems® of Santa Clara, Calif. The QFS can serve as a rapid-access file system for storing and accessing information available within the pod 744. The QFS 792 can support some volume management capabilities, allowing many disks to be grouped together into a file system. File system metadata can be kept on a separate set of disks, which can be useful for streaming applications where long disk seeks cannot be tolerated. Thus, the QFS system can communicate with one or more content search servers 768 or indexers 794 to identify, retrieve, move, or update data stored in the network file systems 796 or other storage systems.

In some implementations, one or more query servers 782 communicate with the NFS 796 to retrieve or update information stored outside of the pod 744. The NFS 796 can allow servers located in the pod 744 to access information to access files over a network in a manner similar to how local storage is accessed. In some implementations, queries from the query servers 782 are transmitted to the NFS 796 via the load balancer 728, which can distribute resource requests over various resources available in the on-demand database service environment. The NFS 796 also can communicate with the QFS 792 to update the information stored on the NFS 796 or to provide information to the QFS 792 for use by servers located within the pod 744.

In some implementations, the pod includes one or more database instances 790. The database instance 790 can transmit information to the QFS 792. When information is transmitted to the QFS, it can be available for use by servers within the pod 744 without using an additional database call. In some implementations, database information is transmitted to the indexer 794. Indexer 794 can provide an index of information available in the database 790 or QFS 792. The index information can be provided to file force servers 786 or the QFS 792.

Figure 8:
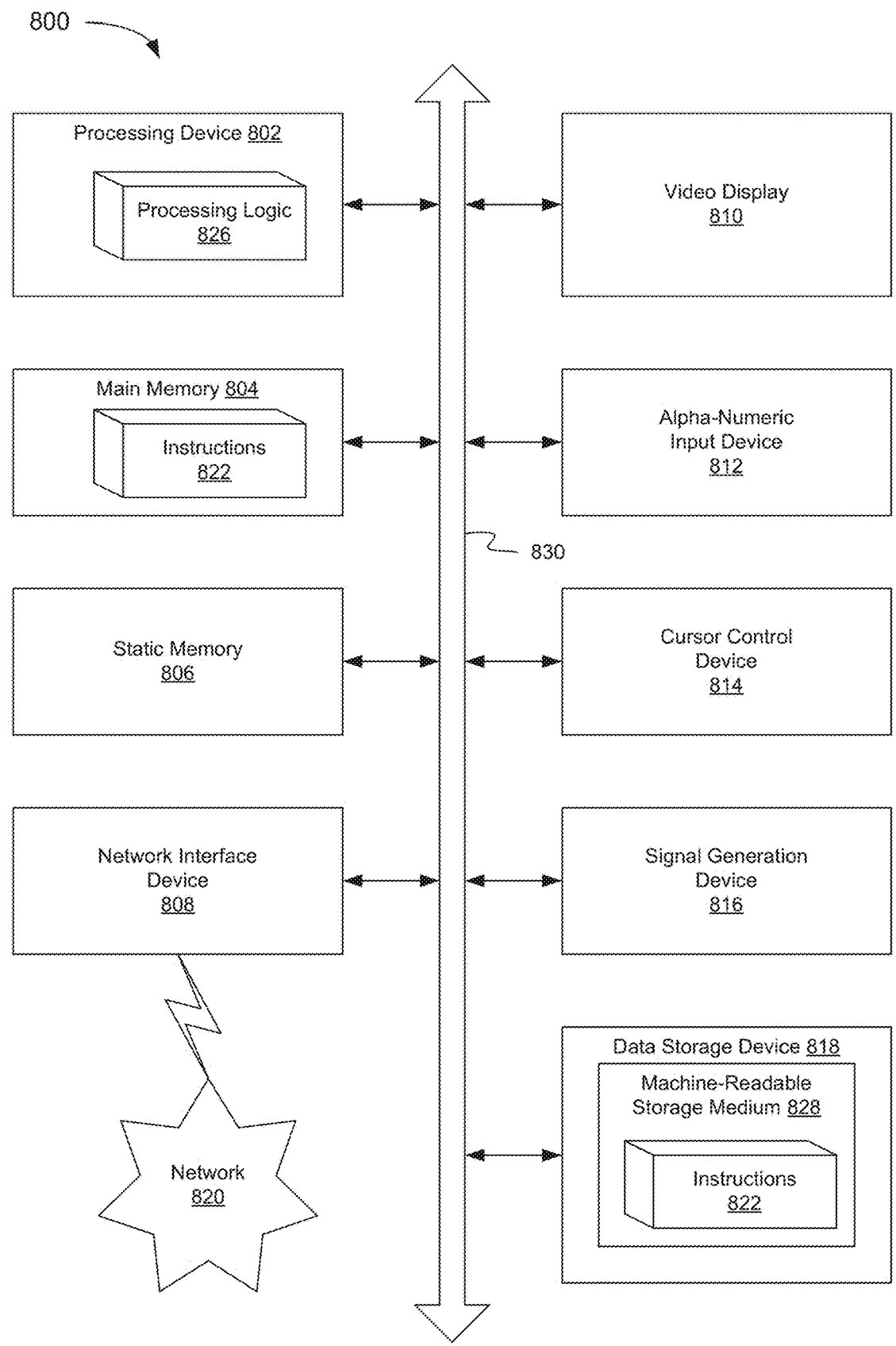
FIG. 8 is a block diagram illustrating an exemplary computer system, according to an embodiment.

FIG. 8 illustrates a diagrammatic representation of a machine in the exemplary form of a computer system 800 within which a set of instructions, for causing the machine to perform any one or more of the methodologies discussed herein, may be executed. The system 800 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 800 may represent an of host computers 110A-110N, 210, message broker 240, application servers 105A-105B or infrastructure monitor 170, as shown in FIGS. 1 and 2.

The exemplary computer system 800 includes a processing device (processor) 802, a main memory 804 (e.g., read-only memory (ROM), flash memory, dynamic random access memory (DRAM) such as synchronous DRAM (SDRAM)), a static memory 806 (e.g., flash memory, static random access memory (SRAM)), and a data storage device 818, which communicate with each other via a bus 830.

Processing device 802 represents one or more general-purpose processing devices such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 802 may also be one or more special-purpose processing devices such as an application specific integrated circuit (ASIC), a field programmable gate array (FPGA), a digital signal processor (DSP), network processor, or the like. The processing device 802 is configured to execute the notification manager 210 for performing the operations and steps discussed herein.

The computer system 800 may further include a network interface device 808. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a computer-readable medium 828 on which is stored one or more sets of instructions 822 (e.g., instructions of infrastructure monitor 170) embodying any one or more of the methodologies or functions described herein. The instructions 822 may also reside, completely or at least partially, within the main memory 804 and/or within processing logic 826 of the processing device 802 during execution thereof by the computer system 800, the main memory 804 and the processing device 802 also constituting computer-readable media. The instructions may further be transmitted or received over a network 820 via the network interface device 808.

While the computer-readable storage medium 828 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a processing device of an infrastructure monitoring device, an indication of a fault on a first host computer of a plurality of host computers, wherein each of the plurality of host computers is associated with a different subset of a plurality of queues, and wherein each of the plurality of queues are serviced by a different subset of the plurality of host computers arranged in a many-to-many relationship;
identifying, by the processing device, a first subset of the plurality of queues associated with the first host computer;
determining, by the processing device, a workload present on the first subset of the plurality of queues;
generating, by the processing device, data descriptive of a single visualization that provides status information corresponding to each of the plurality of host computers, the indication of the fault on the first host computer, status information corresponding to each of the plurality of queues, and the workload present on the first subset of the plurality of queues, wherein the single visualization comprises a first component to present the status information corresponding to each of the plurality of host computers, the first component comprising a circular ring of a plurality of selectable elements corresponding to the plurality of host computers, wherein the single visualization comprises a second component to present the status information corresponding to each of the plurality of queues, the second component comprising a plurality of grid layout of elements corresponding to the plurality of queues in a grid layout in a center of the single visualization and arranged within the circular ring, wherein the plurality of elements corresponding to the plurality of queues in the grid layout present a heat map, the heat map providing an indication of a volume of jobs received at each of the plurality of queues within a set period of time, wherein the single visualization comprises a mapping between the first component and the second component, the mapping to indicate which of the plurality of queues are associated with each of the plurality of host computers arranged in the many-to-many relationship, and wherein, in response to a selection of a selectable element corresponding to the first host computer from the circular ring, the single visualization is configured to display visual links from the first host computer to the plurality of elements in the grid layout corresponding to the first subset of the plurality of queues impacted by the fault on the first host computer; and
causing, by the processing device, presentation of the single visualization within a user interface of the infrastructure monitoring device or a separate device.

2. The method of claim 1, wherein the circular ring comprises a separate indication of one or more metric values corresponding to each of the plurality of host computers.

3. The method of claim 1, further comprising:
receiving, by the processing device, a selection of a first metric view, the selection defining a first metric and a view type;
determining, by the processing device, metric data associated with the first metric for each of the plurality of host computers; and
updating, by the processing device, the single visualization to present the metric data according to the view type.

4. A computer system comprising:
a memory; and
a processing device of an infrastructure monitoring device operatively coupled to the memory, the processing device to:
receive an indication of a fault on a first host computer of a plurality of host computers, wherein each of the plurality of host computers is associated with a different subset of a plurality of queues, and wherein each of the plurality of queues are serviced by a different subset of the plurality of host computers arranged in a many-to-many relationship;
identify a first subset of the plurality of queues associated with the first host computer;
determine a workload present on the first subset of the plurality of queues;
generate data descriptive of a single visualization that provides status information corresponding to each of the plurality of host computers, the indication of the fault on the first host computer, status information corresponding to each of the plurality of queues, and the workload present on the first subset of the plurality of queues, wherein the single visualization comprises a first component to present the status information corresponding to each of the plurality of host computers, the first component comprising a circular ring of a plurality of selectable elements corresponding to the plurality of host computers, wherein the single visualization comprises a second component to present the status information corresponding to each of the plurality of queues, the second component comprising a plurality of elements corresponding to the plurality of queues in a grid layout in a center of the single visualization arranged within the circular ring, wherein the plurality of elements corresponding to the plurality of queues in the grid layout present a heat map, the heat map providing an indication of a volume of jobs received at each of the plurality of queues within a set period of time, wherein the single visualization comprises a mapping between the first component and the second component, the mapping to indicate which of the plurality of queues are associated with each of the plurality of host computers arranged in the many-to-many relationship, and wherein, in response to a selection of a selectable element corresponding to the first host computer from the circular ring, the single visualization is configured to display visual links from the first host computer to the plurality of elements in the grid layout corresponding to the first subset of the plurality of queues impacted by the fault on the first host computer; and cause presentation of the single visualization within a user interface of the infrastructure monitoring device or a separate device.

5. The computer system of claim 4, wherein the circular ring comprises a separate indication of one or more metric values corresponding to each of the plurality of host computers.

6. The computer system of claim 4, wherein the processing device further to:
receive a selection of a first metric view, the selection defining a first metric and a view type;
determine metric data associated with the first metric for each of the plurality of host computers; and
update the single visualization to present the metric data according to the view type.

7. A non-transitory computer-readable storage medium storing instructions which, when executed by a processing device of an infrastructure monitoring device, are capable of causing the processing device to perform operations comprising:
receiving an indication of a fault on a first host computer of a plurality of host computers, wherein each of the plurality of host computers is associated with a different subset of a plurality of queues, and wherein each of the plurality of queues are serviced by a different subset of the plurality of host computers arranged in a many-to-many relationship;
identifying a first subset of the plurality of queues associated with the first host computer;
determining a workload present on the first subset of the plurality of queues;
generating a single visualization that provides status information corresponding to each of the plurality of host computers, the indication of the fault on the first host computer, status information corresponding to each of the plurality of queues, and the workload present on the first subset of the plurality of queues, wherein the single visualization comprises a first component to present the status information corresponding to each of the plurality of host computers, the first component comprising a circular ring of a plurality of selectable elements corresponding to the plurality of host computers, wherein the single visualization comprises a second component to present the status information corresponding to each of the plurality of queues, the second component comprising a plurality of elements corresponding to the plurality of queues in a grid layout in a center of the single visualization and arranged within the circular ring, wherein the plurality of elements corresponding to the plurality of queues in the grid layout present a heat map, the heat map providing an indication of a volume of jobs received at each of the plurality of queues within a set period of time, wherein the single visualization comprises a mapping between the first component and the second component, the mapping to indicate which of the plurality of queues are associated with each of the plurality of host computers arranged in the many-to-many relationship, and wherein, in response to a selection of a selectable element corresponding to the first host computer from the circular ring, the single visualization is configured to display visual links from the first host computer to the plurality of elements in the grid layout corresponding to the first subset of the plurality of queues impacted by the fault on the first host computer; and
causing presentation of the single visualization within a user interface of the infrastructure monitoring device or a separate device.

8. The non-transitory computer-readable storage medium of claim 7, wherein the circular ring comprises a separate indication of one or more metric values corresponding to each of the plurality of host computers.

9. The non-transitory computer-readable storage medium of claim 7, wherein the operations further comprise:
receiving a selection of a first metric view, the selection defining a first metric and a view type;
determining metric data associated with the first metric for each of the plurality of host computers; and
updating the single visualization to present the metric data according to the view type.

* * * * *